(12) United States Patent
Fujiyama et al.

(10) Patent No.: US 7,542,613 B2
(45) Date of Patent: Jun. 2, 2009

(54) IMAGE PROCESSING APPARATUS

(75) Inventors: Michihiro Fujiyama, Kyotanabe (JP);
Seiji Hashimoto, Nishinomiya (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 768 days.

(21) Appl. No.: 11/227,173

(22) Filed: Sep. 16, 2005

(65) Prior Publication Data

US 2006/0062480 A1    Mar. 23, 2006

(30) Foreign Application Priority Data

Sep. 21, 2004 (JP) .............................. 2004-273060
Sep. 29, 2004 (JP) .............................. 2004-283423

(51) Int. Cl.
*G06K 9/36* (2006.01)

(52) U.S. Cl. ...................................... 382/232; 382/103

(58) Field of Classification Search ................ 382/232, 382/103, 260, 286, 262, 278; 358/500, 453, 358/474; 375/E7.134, E7.163; 348/143, 348/150; 235/379; 705/26, 43
See application file for complete search history.

(56) References Cited

U.S. PATENT DOCUMENTS 5,181,104 A * 1/1993 Sugishima et al. .......... 358/500
6,115,505 A * 9/2000 Hashima et al. ............. 382/286
2004/0095477 A1 5/2004 Maki et al.

FOREIGN PATENT DOCUMENTS

JP          2004-72655       3/2004

* cited by examiner

*Primary Examiner*—Anh Hong Do
(74) *Attorney, Agent, or Firm*—Westerman, Hattori, Daniels & Adrian, LLP.

(57) ABSTRACT

When a moving area and a fixed area are detected on a screen, it is determined whether the detected moving area and the fixed area overlap or not. As a result, when it is determined that an overlap exists, a compound area is set so as to include noticed areas to be overlapped. Next, the set compound area is compressed by taking advantage of an ROI function so as to keep a compression target size of the whole screen. Therefore, this enables to reduce a processing amount of a JPEG 2000 CODEC. In addition, a size and a location of the ROI area are changed so as to include a motion range of the object with movement into the noticed area. As a result, it is capable to progress in a surveillance function, because the motion range of the object with movement is included into the noticed area.

15 Claims, 25 Drawing Sheets

FIG. 12

| | R1 | R2 | R3 | R4 |
|---|---|---|---|---|
| $t0 < t \leqq t0+1$ | R1 ◍ | R2 ○ | R3 ○ | R4 ○ |
| $t0+1 < t \leqq t0+2$ | R2 ◍ | R3 ○ | R4 ○ | R1 ◍ |
| $t0+2 < t \leqq t0+3$ | R3 ◍ | R4 ○ | R1 ◍ | R2 ◍ |
| $t0+3 < t \leqq t0+4$ | R4 ◍ | R1 ◍ | R2 ◍ | R3 ◍ |
| $t0+4 < t \leqq t0+5$ | R1 ◍ | R2 ◍ | R3 ◍ | R4 ◍ |
| ⋮ | ⋮ | ⋮ | ⋮ | ⋮ |

FIG. 19

| | R1 | R2 | R3 |
|---|---|---|---|
| $t0 < t \leq t0+1$ | ◎ | ○ | ○ |
| | R2 | R3 | R1 |
| $t0+1 < t \leq t0+2$ | ◎ | ○ | ◎ |
| | R3 | R1 | R2 |
| $t0+2 < t \leq t0+3$ | ◎ | ◎ | ◎ |
| | R1 | R2 | R3 |
| $t0+3 < t \leq t0+4$ | ◎ | ◎ | ◎ |
| ⋮ | ⋮ | ⋮ | ⋮ |

IMAGE PROCESSING APPARATUS

CROSS REFERENCE TO RELATED APPLICATIONS

This present application claims the benefit of Japanese patent application number 2004-273060, filed in Japan on Sep. 21, 2004, and Japanese patent application number 2004-283423, filed in Japan on Sep. 29, 2004, the subject matter of which are hereby incorporated herein reference.

BACKGROUND OF THE INVENTION

1. Field of the Invention

This present invention relates to an image processing apparatus. More specifically, the present invention relates to the image processing apparatus adapted to a surveillance camera system, and respectively compressing a plurality of portions of an image formed a photographed subject image of a field by a plurality of compression rates.

2. Description of the Related Art

In such a kind of a conventional image processing apparatus, by using an ROI (Region Of Interest) function of a JPEG 2000, an image of a noticed area set in a screen is compressed in such a manner that the image of the noticed area becomes a high quality image by being lower compression rate than images of the other areas. As a result, it is capable to reduce a data amount of a whole image vastly, and keep an image signal of the noticed area high quality.

However, when the image signal of different kind of the noticed area are respectively compressed by a different picture quality, a JPEG 2000 CODEC has to compress the image in each area by the different picture quality. Therefore, when there are so many kinds of the areas which are included in the screen, it causes by increasing a processing amount of the JPEG 2000 CODEC. When the image of the area including the object with movement is compressed by setting the ROI area in such a manner that the image becomes the high quality image, if the object with movement stops, then it is determined that the area including the object is a still area, and it is determined that the area isn't the ROI area. As a result, there is a problem that it is not possible to record the object in such a manner that the object image is clear; because the image of the area including the object is compressed with a low quality image.

SUMMARY OF THE INVETION

According to the preferred embodiments, an image processing apparatus, an image compressing apparatus, and its method are provided, capable of reducing a processing amount of a JPEG 2000 CODEC, and capable of progressing in a surveillance function.

When a plurality of noticed areas are detected on a screen which include any notice areas, it is determined whether each noticed area overlaps or not. As a result, if it is determined that an overlap exists, a compound area is set so as to include the noticed areas at which the overlap is detected. In this case, it is capable to reduce an amount of the noticed area because the compound area is set so as to include the noticed areas which are determined that the overlap exists. Therefore, it is capable to reduce a processing amount of an image compressed circuit which compresses the whole screen by taking advantage of the ROI function at a portion of the image of the compound area.

In addition, a photographed subject image of a field is formed by a plurality of portions of the image. Such plurality of the portion of the image are compressed by a plurality of compression rates respectively. A first portion of the image including an object, which is an object with movement, in the plurality of the portion of the image is adopted to a first compression rate. A second portion of the image, which is different from the first portion of the image, in the plurality of the portion of the image is adopted to a second compression rate which is higher than the first compression rate. The first portion of the image is compressed by the first compression rate, and the second portion of the image is compressed by the second compression rate. Therefore, when the compressed subject image of the field is decompressed, the first portion of the image is higher quality image than the second portion of the image.

Further, it is capable to include a motion range of the object with movement into the first portion of the image, because at least one of a location and an image size of the first image is changed according to a motion progress of the object with movement.

BRIEF DESCRIPTION OF THE DRAWINGS

FIG. 12 is a schematic diagram showing the other portion of the operation of the FIG. 9 embodiment;

FIG. 19 is a schematic diagram showing another portion of the operation of the other embodiment of this present invention;

DETAILED DESCRIPTION OF THE PREFERRED EMBODIMENTS

Figure 1:
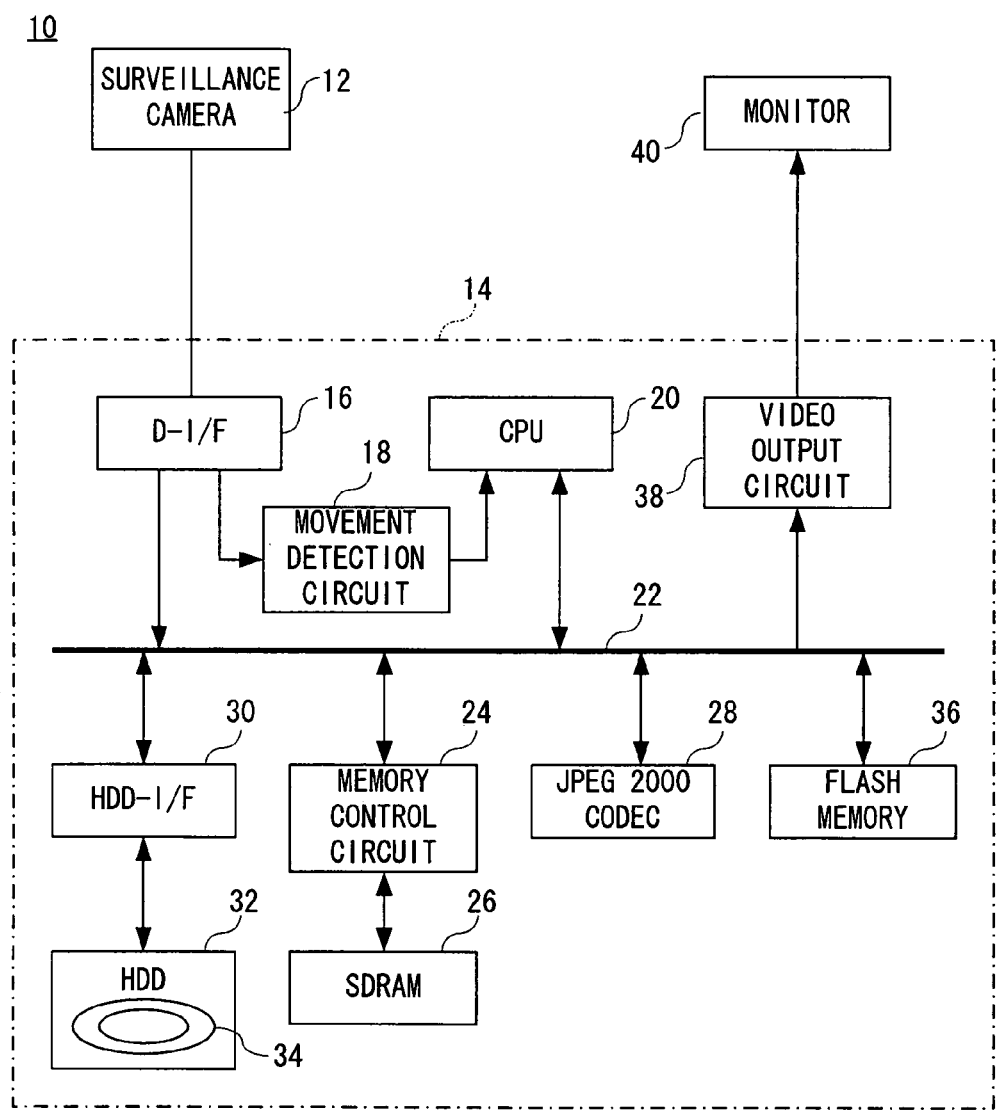
FIG. 1 is a block diagram showing one embodiment of the present invention.

Referring to FIG. 1, a surveillance camera system 10, e.g., a first embodiment of this present invention, includes a surveillance camera 12, a hard disk recorder 14, and a monitor 40. The surveillance camera system 10 is capable to record captured images into the hard disk recorder 14 by compressing the image of a subject which is photographed by the surveillance camera 12, and to reproduce the image on the monitor 40 by decompressing the compressed image to be recorded.

The surveillance camera 12 applies the image of the subject to the hard disk recorder 14 as an analog signal each one field in order to detect whether an object moves or not.

The hard disk recorder 14 is mutually connected to a D-I/F 16, a CPU 20, a JPEG 2000 CODEC 28, a memory control circuit 24, a HDD-I/F 30, a flash memory 36, and a video output circuit 38 via a bus 22. A movement detection circuit 18 is connected to the D-I/F 16 and the CPU 20, a HDD 32 containing a hard disk 34 is connected to the HDD-I/F 30, and an SDRAM 26 is connected to the memory control circuit 24, respectively.

The CPU 20 instructs the D-I/F 16 to capture the analog signal of the subject, the signal is captured with a predetermined period, transmitted from the surveillance camera 12. The D-I/F 16 converts the captured analog signal into a Y signal, which is a luminance signal, and a U (R-Y) signal and a V (B-Y) signal, which are a color difference signal, by a video decoder (not shown) provided inside the D-I/F 16. Next, the D-I/F 16 converts the converted the Y signal, the U signal, and the V signal into an image signal, which is a digital signal, by an A/D conversion circuit (not shown) provided inside the D-I/F 16, and applies the converted image signal to the movement detection circuit 18 and the memory control circuit 24.

The movement detection circuit 18 extracts the Y signal, which is the luminance signal, from the applied image signal and finds a luminance change by comparing a value of the Y signal in a current screen and a value of the Y signal in a screen one field preceding to the current screen. The luminance change of the Y signal is detected for each block in the screen of a monitor 40 dividing a plurality of blocks. The detected luminance change of the Y signal is applied to the CPU 20.

The CPU 20 determines whether the applied luminance change of Y signal exceeds a detection threshold value set in advance each the block or not. As a result, in a case of detecting the block having the luminance change of the Y signal exceeding the detection threshold value, the CPU 20 determines that there is the movement of the object in the block. Thus, a state in which the CPU 20 determines that the luminance change of the Y signal found by the movement detection circuit 18 exceeds the detection threshold value is referred that an internal alarm is detected. When the internal alarm is detected in a certain block, the CPU 20 specifies the block in which the internal alarm is detected, and sets a moving area which is one of the noticed area by taking advantage of the ROI function of the JPEG 2000 to the specified block. The moving area is set so as to move on the screen according to the movement of the object. The image of the object in the moving area is compressed so as to become higher quality image than an image of an area expect for the noticed area in the screen (hereinafter referred to as a "vicinity area").

Further, a fixed area, which is another noticed area by taking advantage of the ROI function, is set in the screen of the monitor 40. The internal alarm isn't set in the block of the fixed area, because a position of the fixed area is fixed in the screen. Therefore, an image of the fixed area is compressed so as to become higher quality image than the image of the vicinity area unrelated to the movement of the object. On the other hand, the image signal applied from the D-I/F 16 to the memory control circuit 24 is written into the SDRAM 26.

A calculation equation of an importance coefficient and an image compression, provided each kind of the area, is stored in the flash memory 36. Further, the importance coefficient is a constant related to the quality of the compressed image, and the quality of the compressed image becomes worse, because the higher the value, the higher the compression of the area. In addition, it is capable to find the compression rate of each area according to the importance coefficient in such a manner that a compression target size in the whole screen becomes constant by using the calculation equation. There are a plurality of kinds of the calculation equation of the image compression according to the kind of the area included in one screen, as explained below.

The CPU 20 applies to the JPEG 2000 CODEC 28 a compression instruction of the image signal. When the JPEG 2000 CODEC 28 receives the compression instruction of the image signal, the JPEG 2000 CODEC 28 requests the memory control circuit 24 to read out the image signal. Next, the JPEG 2000 CODEC 28 captures the image signal to be read out from the SDRAM 26 by the memory control circuit 24. Further, the CPU 20 detects the kind of the area and the image size of each area included in the screen before compressing, reads out from the flash memory 36 the calculation equation of the importance coefficient and the image compression according to the kind of the area and the image size of each area to be detected, and applies the read calculation equation of the importance coefficient and the image compression to the JPEG 2000 CODEC 28.

The JPEG 2000 CODEC 28 compresses the image signals in each area according to the calculation equation of the importance coefficient and the image compression to be applied from the CPU 20. That is, the JPEG 2000 CODEC 28 finds the compression rate of each area in such the manner that the compression target size in the whole screen becomes constant by using the calculation equation of the importance coefficient and the image compression to be applied by the CPU 20. Next, the JPEG 2000 CODEC 28 compresses the image signals in each area according to the found compression rate. As a result, the image quality of the compressed image is different according to the kind of area; in addition, the compression target size becomes constant in the whole screen. The JPEG 2000 CODEC 28 compresses the image signal so as to generate the compressed image signal, and then requests the memory control circuit 24 to write the generated compressed image signal. The memory control circuit 24 writes the compressed image signal into the SDRAM 26 according to the request of the JPEG 2000 CODEC 28.

Next, the CPU 20 applies to the HDD-I/F 30 a recording instruction of the compressed image signal. The HDD-I/F 30 requests the memory control circuit 24 to read out the compressed image signal according to the recording instruction, the memory control circuit 24 applies to the HDD 32 the compressed image signal to be read out from the SDRAM 26. The HDD 32 records the applied compressed image signal into the hard disk 34 in a file format or its own format. It is noted that a file of the compressed image signal recorded in the hard disk 34 is managed in an order of photographing.

Next, a case of reproducing the compressed image signal recorded in the hard disk 34 will be described. First, the CPU 20 instructs the HDD-I/F 30 to read out the compressed image signal. The HDD-I/F 30, to which the reading-out instruction is applied, controls the HDD 32, and sequentially read out the compressed image signal corresponding to the subject photographed by the surveillance camera 12 from the hard disk 34 in the order of photographing. Then, the CPU 20 instructs the memory control circuit 24 to write the read compressed image signal into the SDRAM 26. The memory control circuit 24 writes the compressed image signal into the SDRAM 26 according to the writing instruction.

Next, the CPU 20 applies an expansion instruction of the compressed image signal to the JPEG 2000 CODEC 28. The JPEG 2000 CODEC 28, to which the expansion instruction of the compressed image signal is applied, requests the memory control circuit 24 to read out the compressed image signal, and the memory control circuit 24 reads out the compressed image signal written in the SDRAM 26. The JPEG 2000 CODEC 28 expands the read compressed image signal according to a method defined by the JPEG 2000. The JPEG 2000 CODEC applies the expanded image signal to the memory control circuit 24, and the memory control circuit 24 writes the expanded image signal into the SDRAM 26.

Further, the CPU 20 applies a processing instruction of the expanded image signal to the video output circuit 38. The video output circuit 38, to which the processing instruction of the expanded image signal is applied, requests the memory control circuit 24 to read out the expanded image signal by each one field period, and the memory control circuit 24 applies the expanded image signal to be read out from the SDRAM 26 to the video output circuit 38.

The video output circuit 38 encodes the applied expanded image signal to a composite image signal, and displays the encoded composite image signal on the screen of the monitor 40. At this time, the image of the block in the noticed area becomes a higher quality image than the image of the vicinity area because of the ROI function.

Next, referring to FIG. 2A-FIG. 3B, a case that there are a plurality of the noticed areas on the screen of the monitor 40 will be described. First, referring to FIG. 2A, there are 64 blocks (8-by-8 blocks) divided on the screen of the monitor 40. There is the rectangular fixed area composed of 3-by-3 blocks that the location is fixed on this screen. The internal alarm is set to the block except the block composed of the fixed area.

Figure 2A:
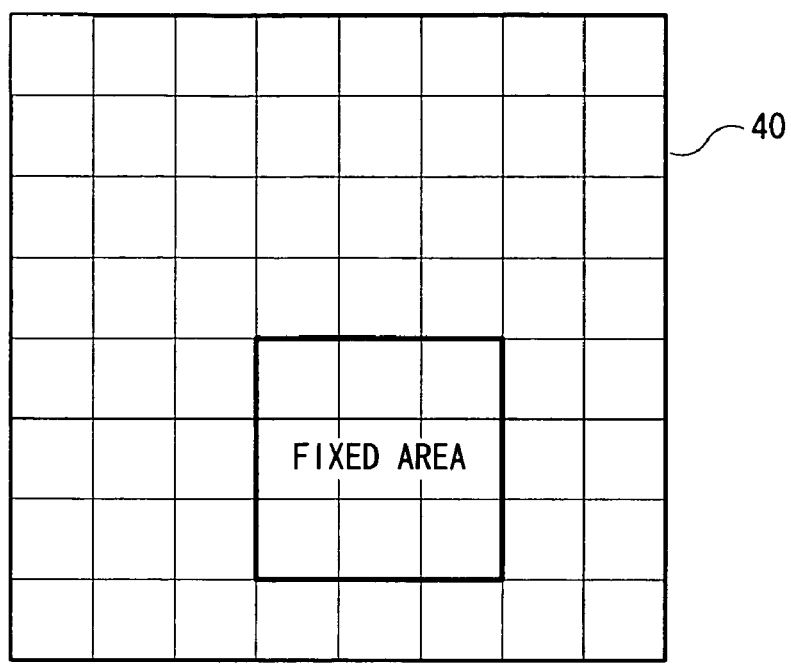
FIGS. 2A and 2B are schematic diagrams showing a portion of an operation of the FIG. 1 embodiment.
Figure 2B:
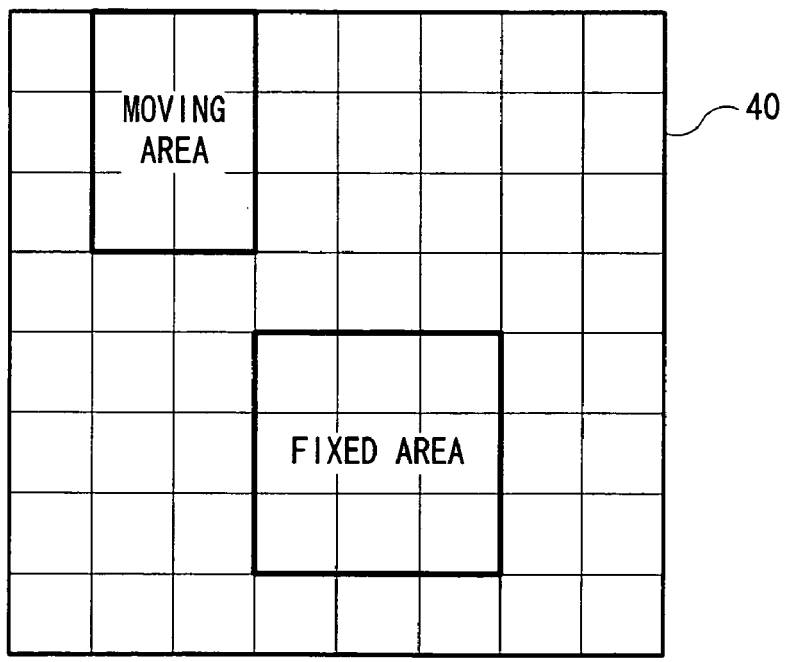

Referring to FIG. 2B, a case that there is the moving area on the screen will be described. The moving area is one kind of the noticed area, and is composed of the block in which the internal alarm is detected. The moving area is a rectangular form composed of 2-by-3 blocks, and moves on the screen in response to the movement of the object.

Figure 3A:
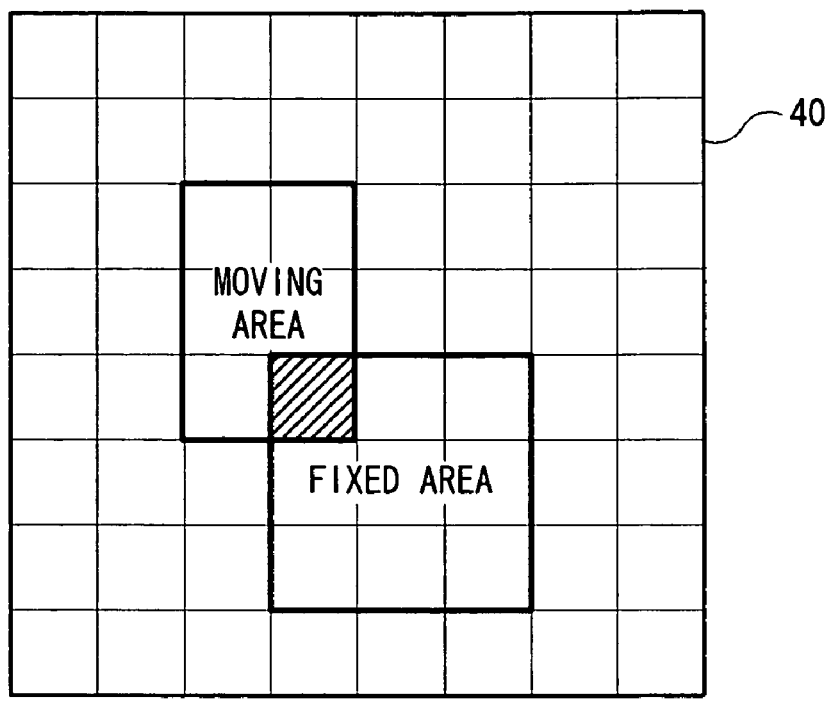
FIGS. 3A and 3B are schematic diagrams showing another portion of the operation of the FIG. 1 embodiment.
Figure 3B:
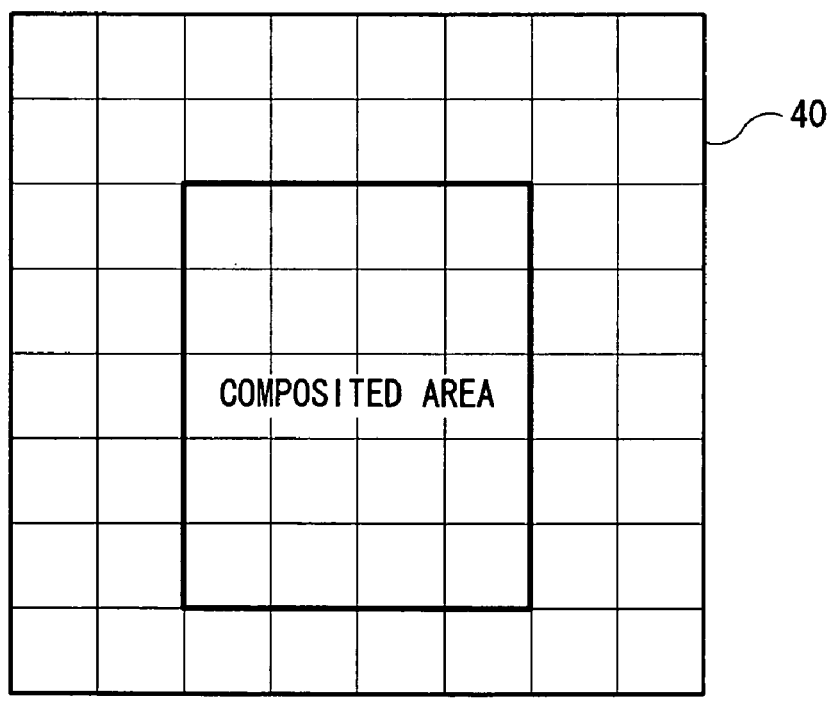

Next, referring to FIG. 3A, a case that the moving area is partially overlapped the fixed area by the movement of the moving area will be described. The JPEG 2000 CODEC 28 compresses the image signal of the moving area by the compression rate to be different from the image signal of the fixed area, because the importance coefficient of the moving area is set the value to be different from the importance coefficient of the fixed area. Thus, as the kind of the noticed area increases, the JPEG 2000 CODEC 28 has to compress the image signal of each area by the different compression rate, and as a result, a processing amount of the JPEG 2000 CODEC 28 increases. So, the rectangular compound area is set as a new area so as to include the moving area and the fixed area as shown in FIG. 3B. As a result, it is capable to reduce the processing amount of the JPEG 2000 CODEC 28 by compressing the image of the compound area by the found compression rate according to the importance coefficient, which is set to the compound area in advance, because the JPEG 2000 CODEC 28 is not necessary to read out the importance coefficient of the moving area and the fixed area respectively, and compress the image signal of the moving area and the fixed area by the different compression rate respectively.

Next, referring to FIG. 2A-FIG. 3B, though the first embodiment was described qualitatively, the first embodiment will be described quantitatively. First, a criterion of estimating the location relationship between the fixed area and the moving area will be described. Then, it is supposed that the forms of the fixed area and the moving area are rectangular for convenience. Therefore, the locations of the fixed area and the moving area can be represented by coordinates of two apexes in a diagonal direction respectively. That is, the coordinates of the apexes A1 and A2 of the fixed area are represented by (Xa1, Ya1) and (Xa2, Ya2) respectively. It is noted that there are the inequality Xa1<Xa2 and Ya1<Ya2 in relation to the coordinates of the apexes A1 and A2. The coordinates of the apexes B1 and B2 of the moving area are represented by (Xb1, Yb1) and (Xb2, Yb2) respectively. It is noted that there are the inequality Xb1<Xb2 and Yb1<Yb2 in relation to the coordinates of the apexes B1 and B2.

The location relationship with the fixed area and the moving area are assumed a plurality of cases as shown in FIG. 4A-5D, e.g. a case of being apart between the fixed area and the moving area, a case of overlapping the portion of the fixed area and the portion of the moving area, a case that the fixed area is completely included in the moving area, a case that the moving area is completely included in the fixed area, and a case of cross-overlapping the fixed area and the moving area.

Figure 4A:
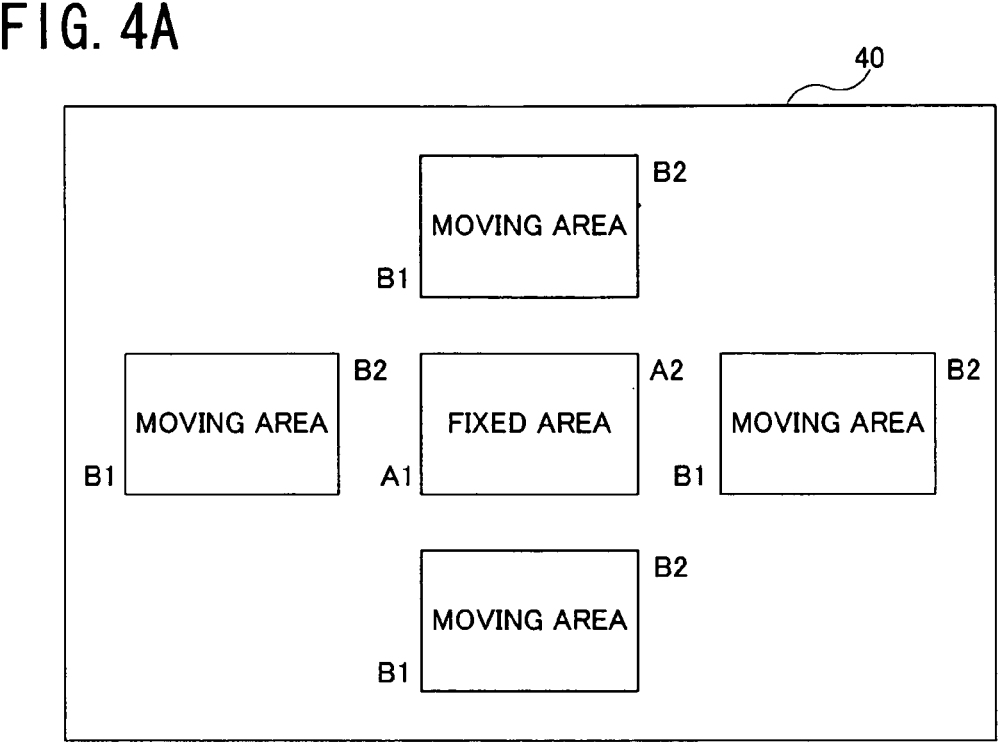
FIGS. 4A and 4B are schematic diagrams showing the other portion of the operation of the FIG. 1 embodiment.

As the case of being apart between the fixed area and the moving area, the location relationship with the coordinates of each apex will be described. In this case, the location relationship with between the fixed area and the moving area are assumed that the moving area is located in one position of upper, lower, left, or right direction as shown in FIG. 4A.

First, as the moving area is apart in the upper direction of the fixed area, it is necessary to satisfy a condition shown in equation (1).

$$Ya2 < Yb1 \tag{1}$$

As the moving area is apart in the lower direction of the fixed area, it is necessary to satisfy a condition shown in equation (2).

$$Yb2 < Ya1 \tag{2}$$

As the moving area is apart in the left direction of the fixed area, it is necessary to satisfy a condition shown in equation (3).

$$Xb2 < Xa1 \tag{3}$$

As the moving area is apart in the right direction of the fixed area, it is necessary to satisfy a condition shown in equation (4).

$$Xa2 < Xb1 \tag{4}$$

Figure 4B:
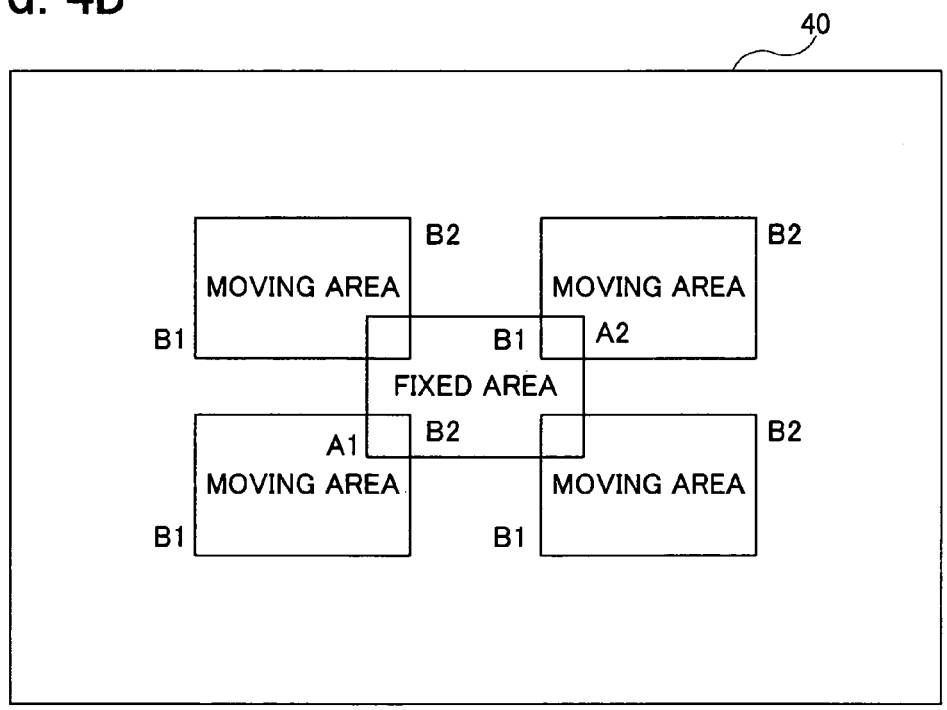

Next, referring to FIG. 4B, as the portion of the fixed area and the portion of the moving area overlap, that is, as the case of including the portion of the moving area in the fixed area, the location relationship with the coordinates of each apex will be described.

First, as the portion of the lower right of the moving area is included in the fixed area, it is necessary to satisfy a condition shown in equation (5).

$$Xa1<=Xb2<=Xa2 \text{ and } Ya1<=Yb1<=Ya2 \quad (5)$$

As the portion of the upper right of the moving area is included in the fixed area, it is necessary to satisfy a condition shown in equation (6).

$$Xa1<=Xb2<=Xa2 \text{ and } Ya1<=Yb2<=Ya2 \quad (6)$$

As the portion of the lower left of the moving area is included in the fixed area, it is necessary to satisfy a condition shown in equation (7).

$$Xa1<=Xb1<=Xa2 \text{ and } Ya1<=Yb1<=Ya2 \quad (7)$$

As the portion of the upper left of the moving area is included in the fixed area, it is necessary to satisfy a condition shown in equation (8).

$$Xa1<=Xb1<=Xa2 \text{ and } Ya1<=Yb2<=Ya2 \quad (8)$$

In addition, as the case that the fixed area is completely included in the moving area, the location relationship with the coordinates of each apex will be described. In this case, referring to FIG. 5A, the location relationship between the fixed area and the moving area is necessary to satisfy a condition shown in equation (9).

$$Xb1<=Xa1<=Xb2 \text{ and } Xb1<=Xa2<=Xb2 \text{ and}$$
$$Yb1<=Ya1<=Yb2 \text{ and } Yb1<=Ya2<=Yb2 \quad (9)$$

Further, as the case that the moving area is completely included in the fixed area, the location relationship with the coordinates of each apex will be described. In this case, referring to FIG. 5B, the location relationship between the fixed area and the moving area is necessary to satisfy a condition shown in equation (10).

$$Xa1<=Xb1<=Xa2 \text{ and } Xa1<=Xb2<=Xa2 \text{ and}$$
$$Ya1<=Yb1<=Ya2 \text{ and } Ya1<=Yb2<=Ya2 \quad (10)$$

Figure 5A:
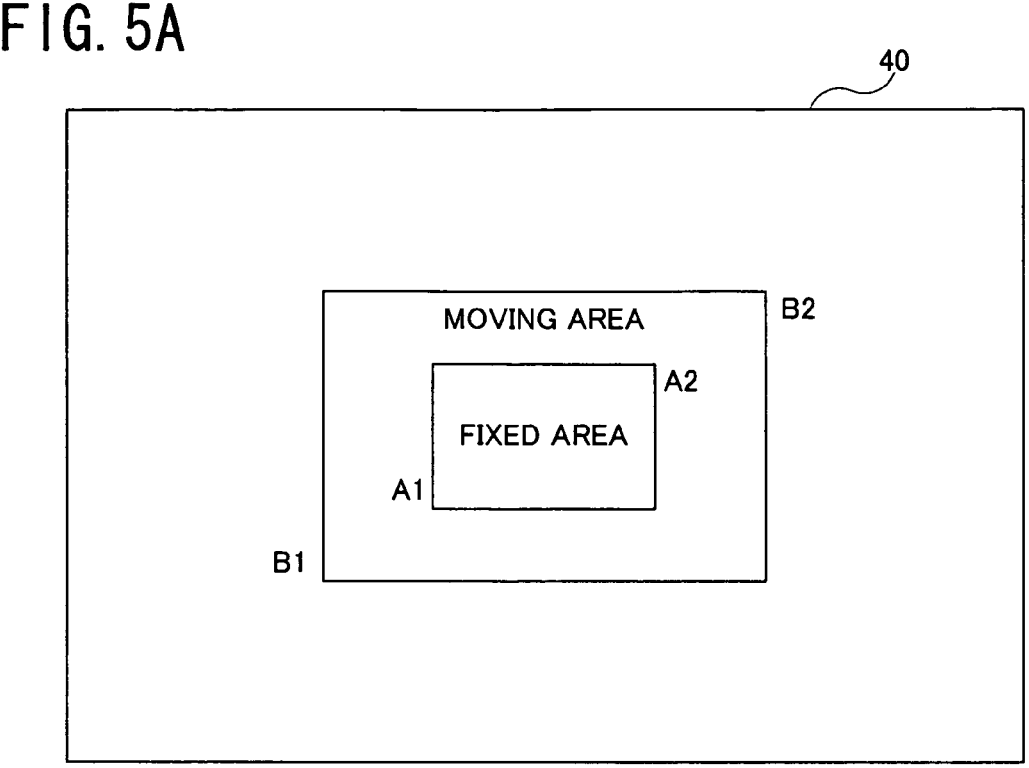
FIGS. 5A-5D are schematic diagrams showing a further portion of the operation of the FIG. 1 embodiment.
Figure 5B:
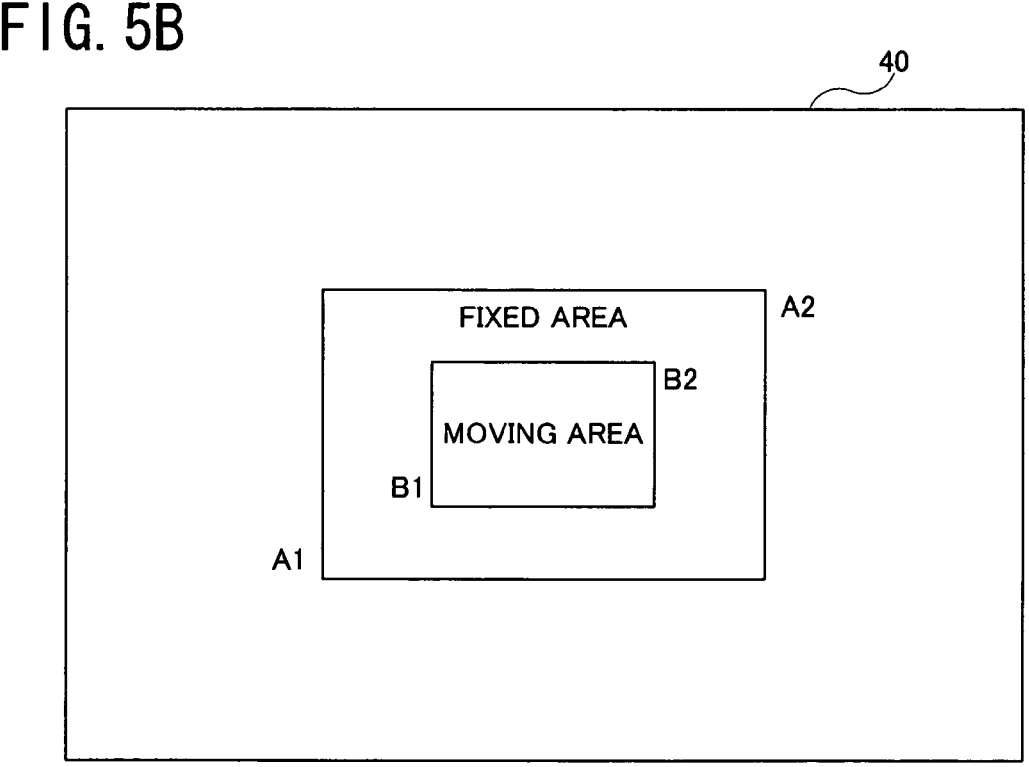
Figure 5C:
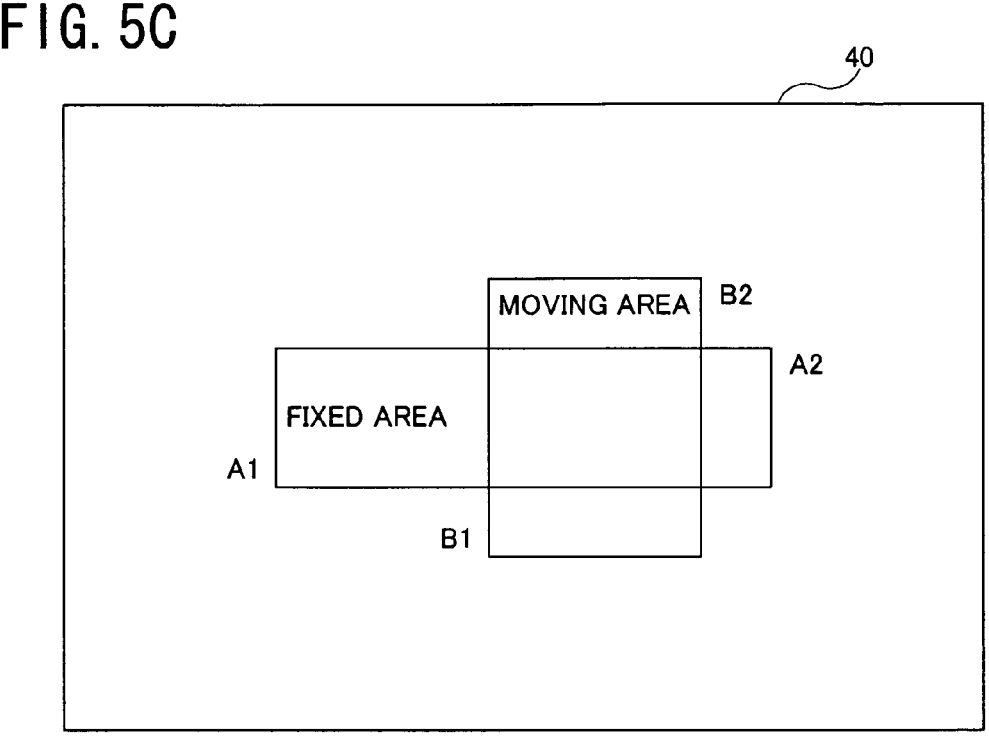

In addition, as the case of cross-overlapping the fixed area and the moving area, the location relationship with the coordinates of each apex will be described. Referring to FIG. 5C, the location relationship between the fixed area and the moving area is necessary to satisfy a condition shown in equation (10-1).

$$Xa1<=Xb1<=Xa2 \text{ and } Yb1<=Ya1<=Yb2 \quad (10\text{-}1)$$

Figure 5D:
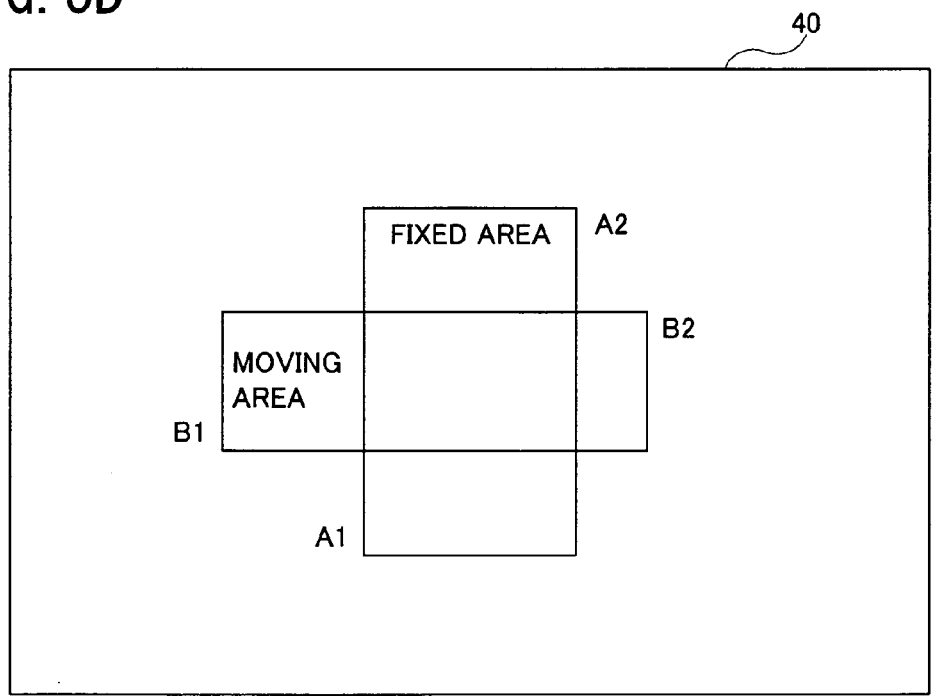

Further, referring to FIG. 5D, the location relationship between the fixed area and the moving area is necessary to satisfy a condition shown in equation (10-2)

$$Xb1<=Xa1<=Xb2 \text{ and } Ya1<=Yb1<=Ya2 \quad (10\text{-}2)$$

Figure 6A:
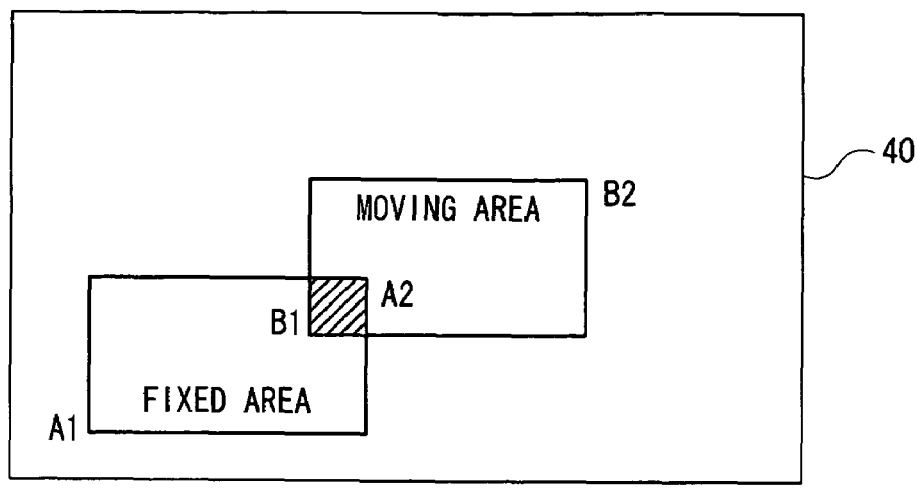
FIGS. 6A-6B are schematic diagrams showing another portion of the operation of the FIG. 1 embodiment.
Figure 6B:
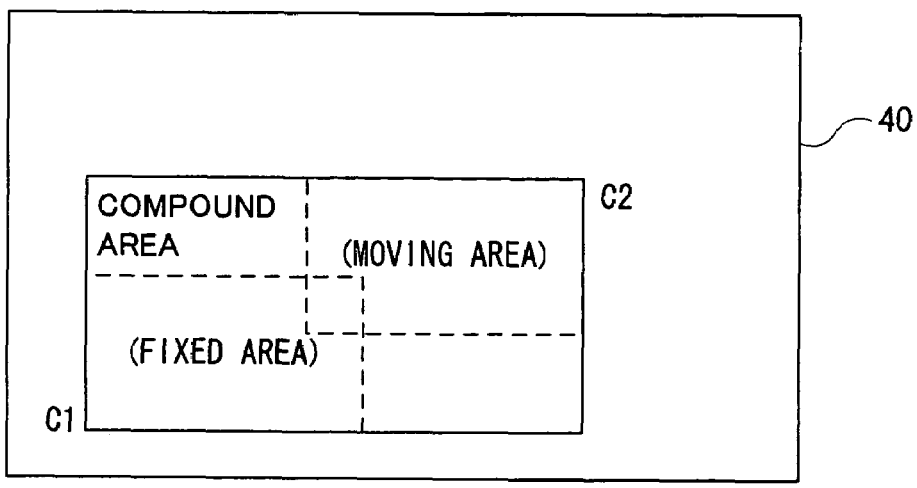

Next, as the portion of the moving area is included in the fixed area as shown in FIG. 6A, the case that the compound area is set as the new area so as to include the fixed area and the moving area will be described. In this case, referring to FIG. 6B, a minimum value and a maximum value are respectively defined as Xmin and Xmax in four X coordinates Xa1, Xa2, Xb1, and Xb2 of the fixed area and the moving area. Similarly, a minimum value and a maximum value are respectively defined as Ymin and Ymax in Y coordinates Ya1, Ya2, Yb1, and Yb2. Then, coordinates of two apexes C1 and C2 in the diagonal direction of the compound area are (Xmin, Ymin) and (Xmax, Ymax) respectively. As a result, the fixed area and the moving area are included in the newly set compound area.

Similarly, as the case that the fixed area is completely included in the moving area and the moving area is completely included in the fixed area, the compound area is newly set. In this case, the newly set compound areas are respectively correspondent to the moving area and the fixed area.

Next, as each state shown in FIG. 2A-3B, a method of compressing the image by using the ROI function without changing the compression target size will be described. It is supposed that the image size of the whole screen is W, and the compression target size is Q.

First, in a case that all areas on the whole screen are the vicinity area, that is, a case that the noticed area is not set on the whole screen will be described. In this case, the compression target size Q is $$Q=Lz*k1*Wz \quad (11).$$

It is noted that the image size of the vicinity area is Wz, the importance coefficient of the vicinity area is Lz, and a first proportional constant is k1. Next, as shown in FIG. 2A, in a case that there is the only fixed area on the screen, the compression target size Q is $$Q=(La*Wa+Lz*Wz)*k2 \quad (12)$$

It is noted that the image size of the fixed area is Wa, the importance coefficient of the fixed area is La, and a second proportional constant is k2. As the compression target size of the equation (12) is same as one of the equation (11), the equation (12) is shown as following.

$$Q=(La*Wa+Lz*Wz)*k2=(La*Wa+Lz*Wz)*(Wz*Lz/$$
$$(Wa*La+Wz*Lz))*k1=((La*Wa)*(Wz*Lz/$$
$$(Wa*La+Wz*Lz))*k1+((Lz*Wz)*(Wz*Lz/$$
$$(Wa*La+Wz*Lz))*k1 \quad (13)$$

Referring to the equation (13), by replacing (Wz*Lz/(Wa*La+Wz*Lz))*k1 with the second proportional constant k2, the image signal of the whole screen including the fixed area and the vicinity area could be compressed without changing the compression target size Q on the whole screen.

Similarly, a case that there is the only moving area on the screen could be found. That is, $$Q=(Lb*Wb+Lz*Wz)*k3=((Lb*Wb)*(Wz*Lz/(Wb*Lb+$$
$$Wz*Lz))*k1+((Lz*Wz)*(Wz*Lz/(Wb*Lb+$$
$$Wz*Lz))*k1 \quad (14)$$

It is noted that the image size of the moving area is Wb, the importance coefficient of the moving area is Lb, and a third proportional constant is k3.

Referring to the equation (14), by replacing (Wz*Lz/(Wb*Lb+Wz*Lz))*k1 with the third proportional constant k3, the image signal of the whole screen including the moving area and the vicinity area could be compressed without changing the compression target size Q on the whole screen.

Next, as shown in FIG. 2B, in a case that there are the fixed area and the moving area, and these are apart each other, similarly the compression target size Q could be found as following.

$$Q=(La*Wa+Lb*Wb+Lz*Wz)*k4=((La*Wa)*(Wz*Lz/$$
$$(Wa*La+Wb*Lb+Wz*Lz))*k1+((Lb*Wb)*$$
$$(Wz*Lz/(Wa*La+Wb*Lb+Wz*Lz))*k1+((Lz*Wz)$$
$$*(Wz*Lz/(Wa*La+Wb*Lb+Wz*Lz))*k1 \quad (15)$$

It is noted that a fourth proportional constant is k4.

Referring to the equation (15), by replacing (Wz*Lz/(Wa*La+Wb*Lb+Wz*Lz))*k1 with the fourth proportional constant k4, the image signal of the whole screen including the fixed area, the moving area, and the vicinity area could be compressed without changing the compression target size Q on the whole screen.

In addition, as shown in FIG. 3B, in the case that at least the portion of the moving area includes in the fixed area, the compound area is formed so as to include the fixed area and the moving area completely. At this time, similarly, the compression target size could be found as following.

$$Q = (Lc*Wc + Lz*Wz)*k5 = ((Lc*Wc)*(Wz*Lz/(Wc*Lc + Wz*Lz))*k1 + ((Lz*Wz)*(Wz*Lz/(Wc*Lc + Wz*Lz))*k1 \quad (16)$$

It is noted that the image size of the compound area is Wc, the importance coefficient of the compound area is Lc, and a fifth proportional constant is k5.

Referring to the equation (16), in the case that the compound area is set from the fixed area and the moving area, by replacing (Wz*Lz/(Wc*Lc+Wz*Lz))*k1 with the fifth proportional constant k5, the image signal of the whole screen including the compound area and the vicinity area could be compressed without changing the compression target size Q on the whole screen. Thus, by setting the compound area newly, it is capable to reduce the processing amount of the JPEG 2000 CODEC 28, because it is unnecessary to compress the fixed area and the moving area by the different compression rate respectively.

Figure 7:
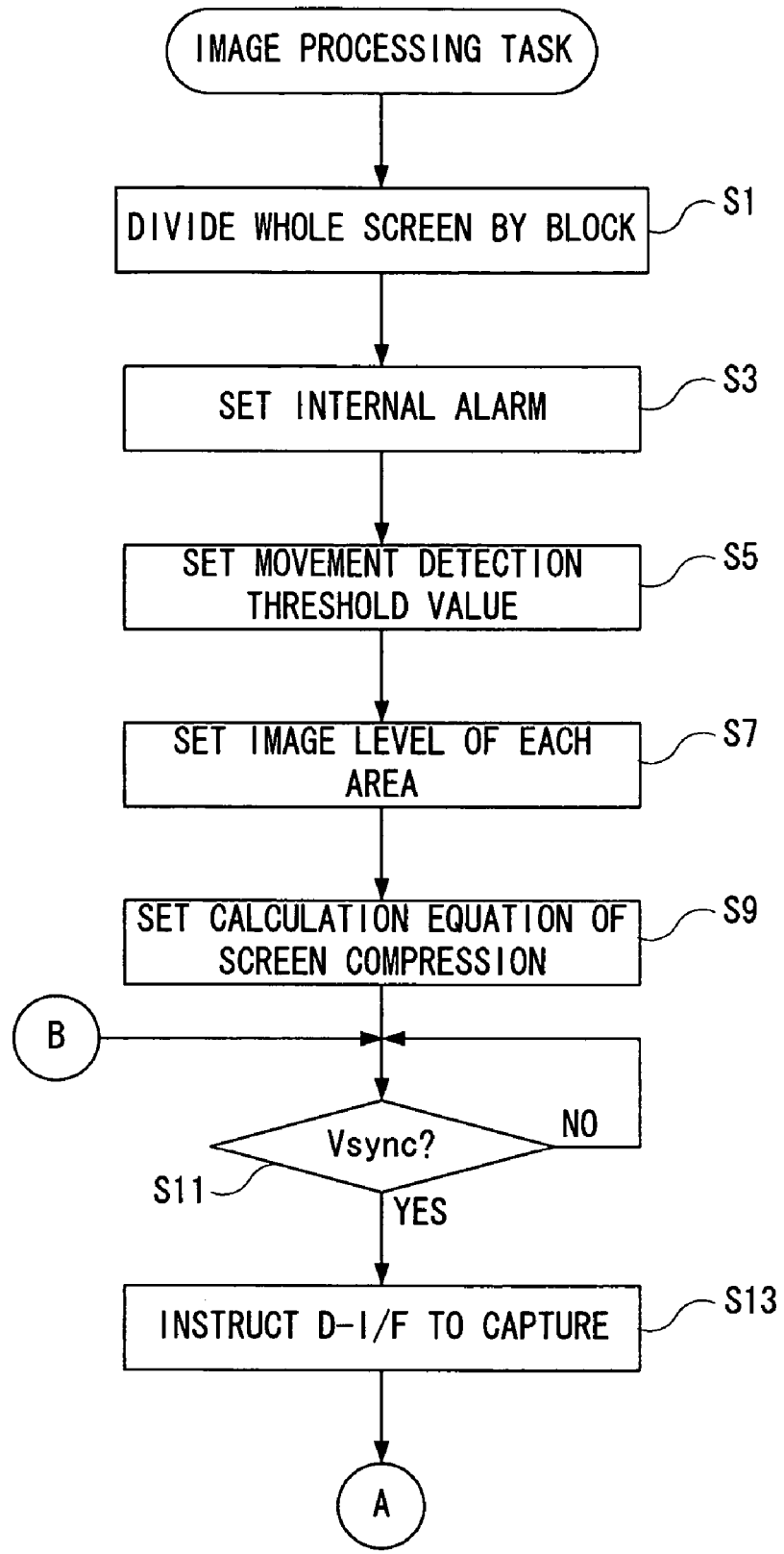
FIG. 7 is a flowchart showing the other of the operation of the FIG. 1 embodiment.
Figure 8:
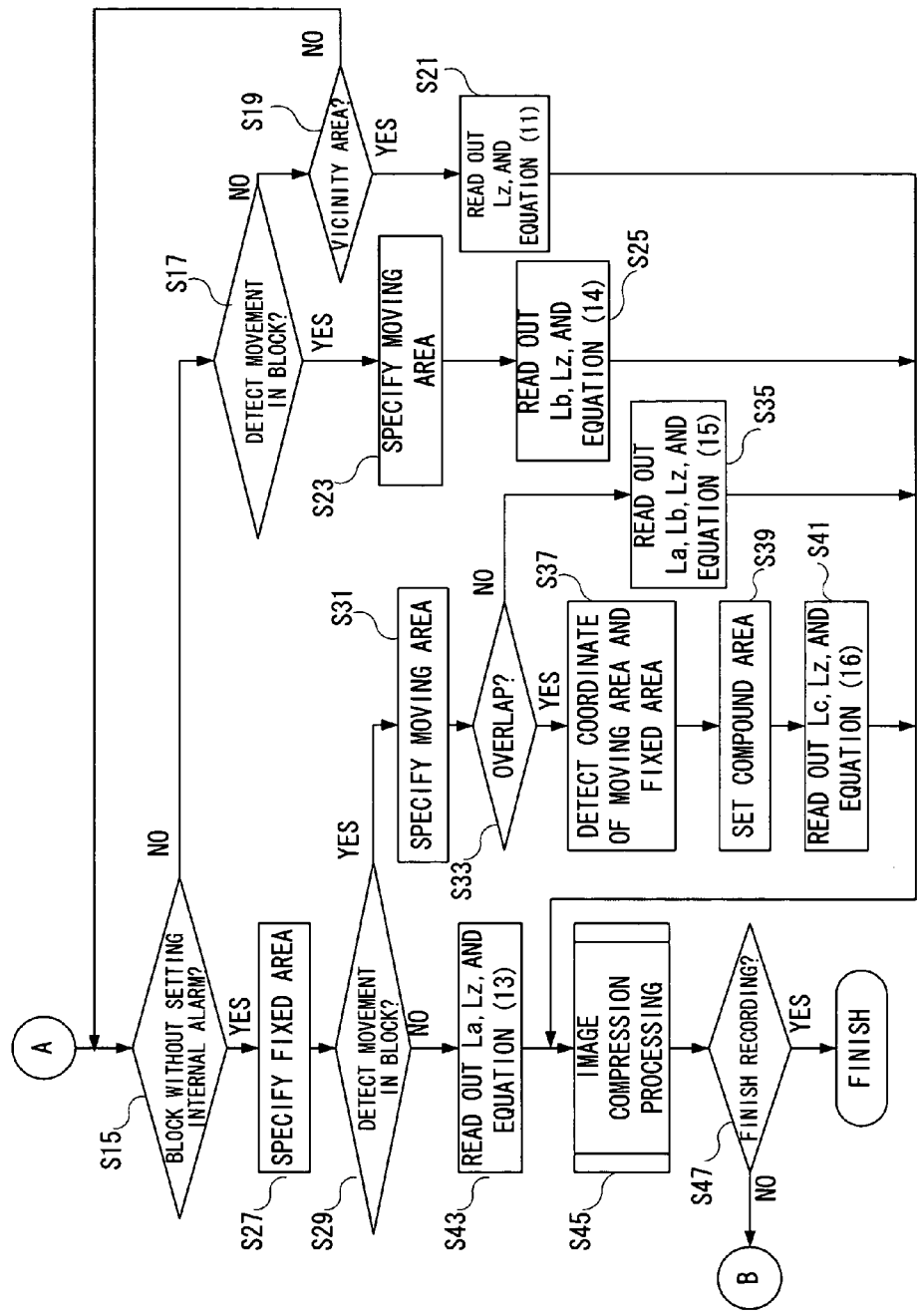
FIG. 8 is a flowchart showing the portion of the operation of the FIG. 1 embodiment.

Next, referring to FIG. 7 and FIG. 8, when the noticed area is set on the portion of the screen in this surveillance camera system 10, a processing flow of compressing the image signal in each area without changing the compression target size of the whole screen will be described.

First, in a step S1, the whole screen of the monitor 40 is divided by 8-by-8 blocks. In a step S3, the block to which the internal alarm is set on the divided screen, that is, an arrangement of the block found the luminance change of the Y signal by the movement detection circuit 18 is decided. In a step S5, the detection threshold value of the luminance change of the Y signal detected by the movement detection circuit 18 is set, and stored into the flash memory 36. In a step S7, the importance coefficient as to the vicinity area, the fixed area, the moving area, and the compound area is respectively set, and stored into the flash memory 36. In a step S9, without changing the compression target size of the image signal on the whole screen, the compressed calculation equation (11), (13), (14), (15), and (16) are stored into the flash memory 36.

In a step S11, the CPU 20 is waiting until a vertical synchronizing signal is occurred. In a step S13, when the vertical synchronizing signal is occurred, the CPU 20 instructs the D-I/F 16 to capture the analog signal from the surveillance camera 12. The D-I/F 16 generates the Y signal, the U signal, and V signal from the captured analog signal, and converts the generated signals into the digital signal.

In a step S15, the CPU 20 determines whether or not there is the block to which the internal alarm is not set. As a result, if NO, the process advances to a step S17, the CPU 20 determines whether there is the block to which the movement is detected by the internal alarm or not. As a result, if NO, further the process advances to a step S19, the CPU 20 determines whether the screen is composed of the only vicinity area or not.

If NO in a step S19, the process returns to the step S15, and if YES, the process advances to a step S21. In a step S21, the CPU 20 reads out the importance coefficient of the vicinity area Lz and equation (11) from the flash memory 36, and the process advances to a step S45.

In a step S17, if YES, the CPU 20 specifies the moving area composed of the block in which the internal alarm is detected in a step S23. In a step S25, the CPU 20 reads out the importance coefficient of the moving area Lb and the vicinity area Lz, and equation (14), and the process advances to the step S45.

If YES in a step S15, the CPU 20 specifies the fixed area composed of the block that the internal alarm is not set in a step S27. In a step S29, the CPU determines whether there is the block detected the movement of the object by the internal alarm or not. As a result, if YES, the process advances to a step S31, the CPU 20 specifies the moving area composed of the block in which the internal alarm is detected.

In a step S33, the CPU 20 determines whether the fixed area and the moving area overlap or not. It is noted that the determination whether the fixed area and the moving area overlap or not is to determine whether the coordinates of the apexes of the fixed area and the moving area is satisfied the condition shown either of the equation from (5) to (8) or not. In a step S35, the CPU 20 reads out the importance coefficient of the fixed area La, the moving area Lb, and the vicinity area Lz and the equation (15), and the process advances to the step S45.

If YES in a step S33, the CPU 20 detects the coordinates of the apexes in the diagonal direction of the moving area and the fixed area respectively in a step 37. In a step S39, the CPU 20 sets the compound area including the moving area and the fixed area. That is, the CPU 20 sets the rectangular compound area having apexes in the diagonal direction composed of an apex found by the maximum value of an X direction and the maximum value of a Y direction, and an apex found by the minimum value of the X direction and the minimum value of the Y direction. In a step S41, the CPU 20 reads out the importance coefficient of the compound area Lc and the vicinity area Lz, and equation (13), and the process advances to the step S45.

If NO in the step S29, the CPU 20 reads out importance coefficient of the fixed area La and the vicinity area Lz, and equation (13), and the process advances to the step S45.

In the step S45, the JPEG 2000 CODEC 28 finds the compression rate of the each area according to the importance coefficient of each area applied by the CPU 20 and the calculation equation of the image compression found by the kind of the area included in the screen. Then, the image signal of each area is compressed by the found compression rate. As a result, it is capable to compress in such a manner that the compression target area becomes constant with keeping the image of the noticed area or the compound area higher quality than the image of the vicinity area. The compressed image signal is recorded into the hard disk 34 via the HDD 32. In a step S47, the CPU 20 determines whether it finishes recording into the hard disk 34 or not. As a result, if NO, the process returns to the step S11, and if YES, the process is finished.

It is noted that the luminance change of the Y signal in each block is found and it is supposed that the movement of the object is detected when the found luminance change exceeds the detection threshold value is in the above embodiments. However, without limiting the above method of detecting the movement of the object, a moving vector in each block is found and it is able to adopt a manner that the movement of the object is detected according to the length of the found moving vector In addition, as the condition of setting the compound area, it is able to adopt a case that the fixed area and the other fixed area overlap or the moving area and the other moving area overlap without limiting the case that the fixed area and the moving area overlap.

Further, as the condition of setting the compound area, it is able to adopt a case that three or more noticed areas overlap without limiting the case that two noticed areas overlap.

Figure 9:
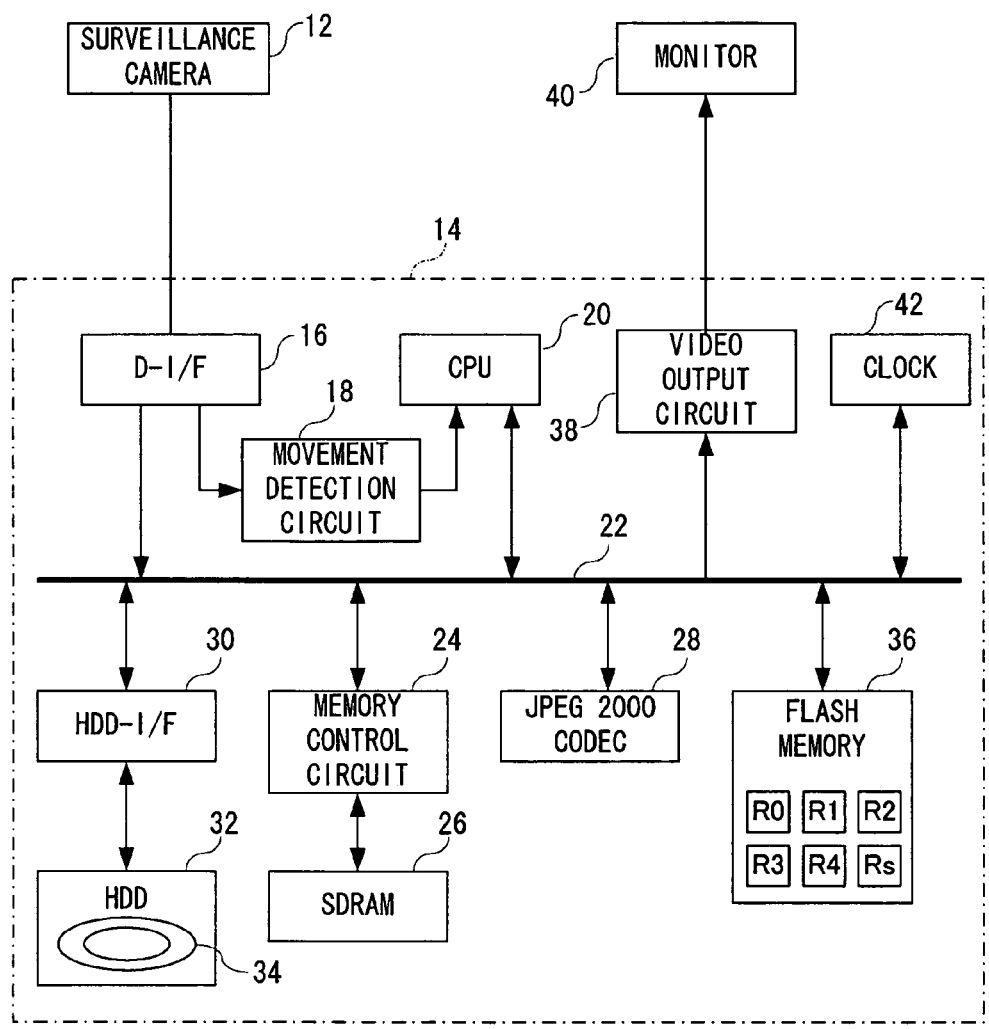
FIG. 9 is a block diagram showing another embodiment of the present invention.

Next, a second embodiment of this present invention will be described. Referring to FIG. 9, a surveillance camera system 100 of the second embodiment is an apparatus that adds a clock 42 to the structure of the surveillance camera system 10 of the first embodiment. Regarding the structure other than this, by applying identical reference numerals to the same or similar portions, the detailed descriptions are herein omitted because they are the same or similar to those of the first embodiment.

Then, the hard disk recorder 14 is mutually connected the clock 42 via the bus 22.

In the same way as in the first embodiment, when the internal alarm is detected in a certain block by the moving detection circuit 18, the CPU 20 specifies the block and sets an ROI area to the specified block by using the ROI function. As the ROI area is set, the image of object in the ROI area is compressed so as to become higher quality image than an area except the ROI area (hereinafter referred to as a "vicinity area" in the same as in the first embodiment)

The CPU 20 applies to the JPEG 2000 CODEC 28 a location and an image size of the ROI area (hereinafter referred to as "ROI information"), and instructs the JPEG 2000 CODEC 28 so as to compress an image signal of the ROI area and an image signal of the vicinity area by different compression rates respectively. When the JPEG 2000 CODEC 28 receives the compression instruction of the image signal, the JPEG 2000 CODEC 28 requests the memory control circuit 24 to read out the image signal. Next, the JPEG 2000 CODEC 28 captures the image signal to be read out from the SDRAM 26 by the memory control circuit 24. The CPU 20 reads out the ROI information corresponding to the read image signal from the flash memory 36, and applies the read ROI information to the JPEG 2000 CODEC 28.

The JPEG 2000 CODEC 28 compresses the image signals of the ROI area and the vicinity area to be set according to the ROI information applied by the CPU 20 by the different compression rate respectively. The JPEG 2000 CODEC 28 compresses the image signal so as to generate the compressed image signal, and then requests the memory control circuit 24 to write the generated compressed image signal. The memory circuit 24 writes the compressed image signal into the SDRAM 26 according to the request of the JPEG 2000 CODEC 28.

Next, the CPU 20 applies a recording instruction of the compressed image signal to the HDD-I/F 30. The HDD-I/F 30 requests the memory control circuit 24 to read out the compressed image signal according to the recording instruction, and applies to the HDD 32 the compressed image signal to be read out from the SDRAM 26 by the memory control circuit 24. The HDD 32 records the applied compressed image signal into the hard disk 34 in a file format or its own format. It is noted that a file of the compressed image signal recorded in the hard disk 34 is managed in an order of photographing.

Next, a case of reproducing the compressed image signal recorded in the hard disk 34 will be described. First, the CPU 20 instructs the HDD-I/F 30 to read out the compressed image signal. The HDD-I/F 30, to which the reading-out instruction is applied, controls the HDD 32, and sequentially reads out the compressed image signal corresponding to the subject photographed by the surveillance camera 12 from the hard disk 34 in the order of photographing. Then, the CPU 20 instructs the memory control circuit 24 to write the read compressed image signal into the SDRAM 26. The memory control circuit 24 writes the compressed image signal into the SDRAM 26 according to the writing instruction.

Next, the CPU 20 applies an expansion instruction of the compressed image signal to the JPEG 2000 CODEC 28. The JPEG 2000 CODEC 28, to which the expansion instruction of the compressed image signal is applied, requests the memory control circuit 24 to read out the compressed image signal, and the memory control circuit 24 reads out the compressed image signal written in the SDRAM 26. The JPEG 2000 CODEC 28 expands the read compressed image signal according to a method defined by the JPEG 2000. As this time, the CPU 20 reads out the ROI information corresponding to the compressed image signal from the flash memory 36, and determines whether the ROI area is set to the compressed image signal or not. Then, when the ROI area is set, the JPEG 2000 CODEC 28 expands the image signal of the ROI area and the vicinity area according to the different compression rate respectively. The JPEG 2000 CODEC 28 applies the expanded image signal to the memory control circuit 24, and the memory control circuit 24 writes the expanded image signal into the SDRAM 26.

Further, the CPU 20 applies a processing instruction of the expanded image signal to the video output circuit 38. The video output circuit 38, to which the processing instruction of the expanded image signal is applied, requests the memory control circuit 24 to read out the expanded image signal by each one field period, and the memory control circuit 24 applies the expanded image signal to be read out from the SDRAM 26 to the video output circuit 38.

The video output circuit 38 encodes the applied expanded image signal to a composite image signal, and displays the encoded composite image signal on the screen of the monitor 40. At this time, the image of the object included in the ROI area is reproduced as a higher quality image than the image of the vicinity area.

Figure 10A:
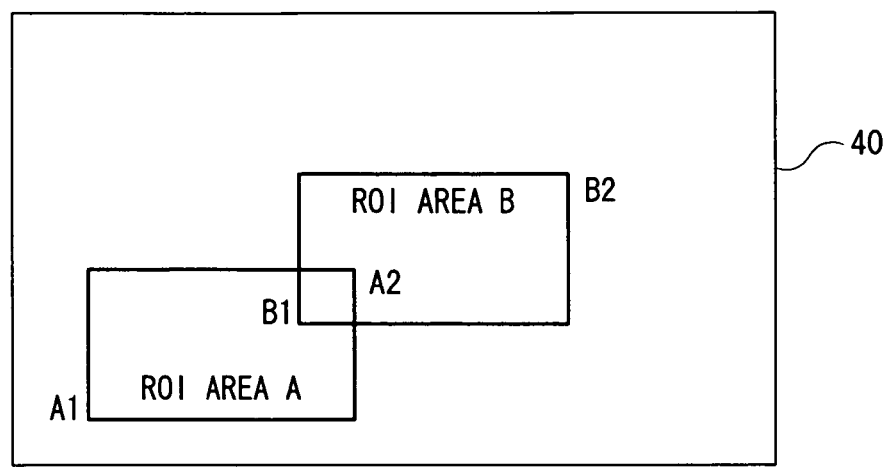
FIGS. 10A and 10B are schematic diagrams showing the portion of an operation of a FIG. 9 embodiment.
Figure 10B:
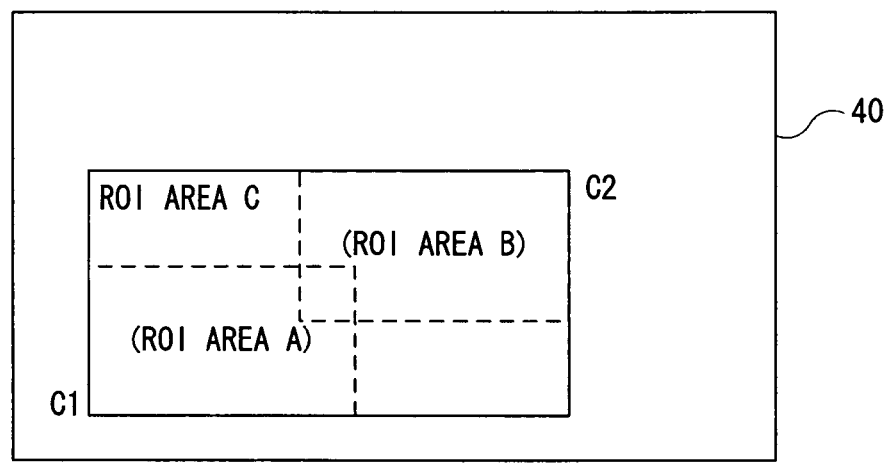

Referring to FIGS. 10A and 10B, a method of compounding two ROI areas will be described. It is supposed that the forms of the ROI area are rectangular for convenience. Therefore, the location of the ROI area is able to represent by coordinates of two apexes in a diagonal direction. As shown in FIG. 10A, the coordinates of the apexes A1 and A2 of the ROI area A are represented by (Xa1, Ya1) and (Xa2, Ya2) respectively. It is noted that there are the inequality Xa1<Xa2 and Ya1<Ya2 in relation to the coordinates of the apexes A1 and A2. In addition, the coordinates of the apexes B1 and B2 of the ROI area B are represented by (Xb1, Yb1) and (Xb2, Yb2) respectively. It is noted that there are the inequality Xb1<Xb2 and Yb1<Yb2 in relation to the coordinates of the apexes B1 and B2.

In this case, in the same way as in the first embodiment, the minimum value and the maximum value are respectively defined as Xmin and Xmax in four X coordinates Xa1, Xa2, Xb1, and Xb2 of the two ROI areas A and B as shown in FIG. 10B. Similarly, the minimum value and the maximum value are respectively defined as Ymin and Ymax in four Y coordinates Ya1, Ya2, Yb1, and Yb2. Then, coordinates of two apexes C1 and C2 in the diagonal direction of the compound ROI area are (Xmin, Ymin) and (Xmax, Ymax) respectively. Thus, a newly ROI area C is compounded from the two ROI areas A and B.

Figure 11:
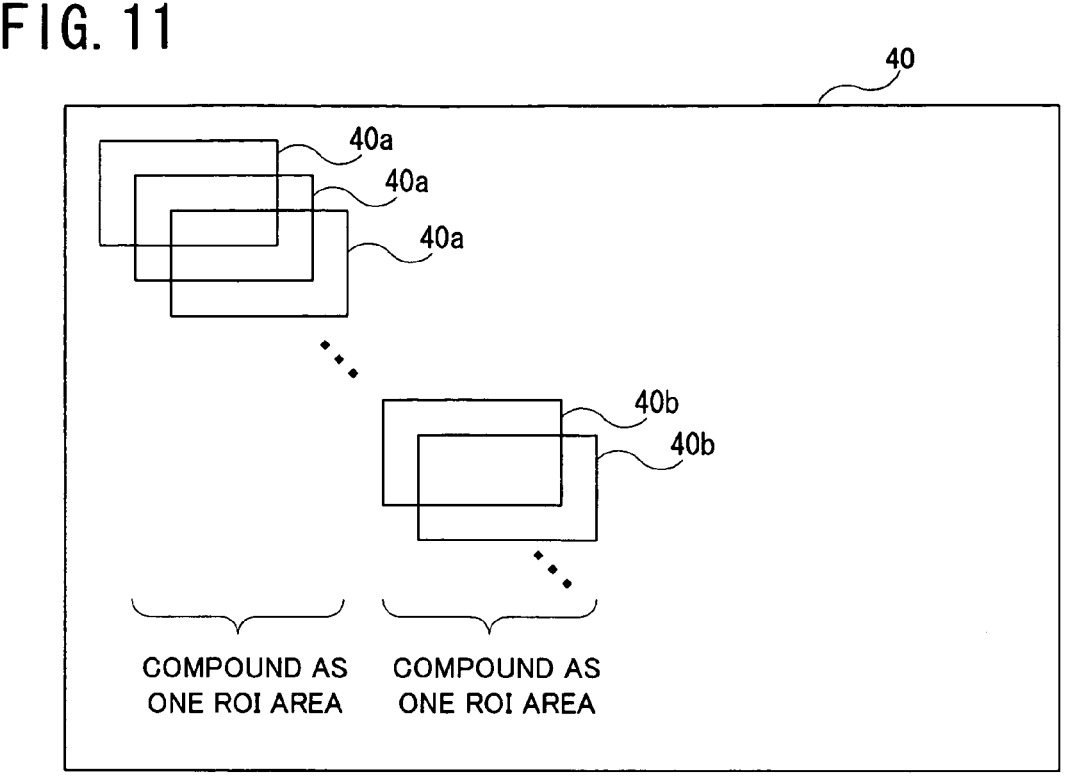
FIG. 11 is a schematic diagram showing another portion of the operation of the FIG. 9 embodiment.

FIG. 11 is the schematic diagram showing in one screen about the way that the ROI area of each screen moves according the movement of the object. Referring to FIG. 11, this surveillance camera system 100 captures the image signal from the surveillance camera 12 each one field period by synchronizing a vertical synchronizing signal Vsync, and a case of compounding the ROI area included in the captured image signal will be described.

In a case that there is the object with movement such as a trespasser etc. in the screen displayed in the monitor 40, the CPU 20 sets a ROI area 40a to the area including the object. Then, the CPU 20 compounds the newly ROI area to the image signal captured at predetermined time according to the ROI information of the ROI area 40a and a ROI information r0 stored in a working area R0 of the flash memory 36. Then, the CPU 20 finds the ROI information of the compound ROI area, and renews the ROI information r0 stored in the working area R0 according to the found ROI information. The CPU 20 repeats the above-mentioned operation for one second after the predetermined time, and transfers the ROI information r0 stored in the working area R0 into a memory area R1 of the flash memory 36 after it takes one second. Then, the CPU 20 resets the ROI information r0 of the working area R0. As a result, the CPU 20 finds the ROI information of the ROI area compound according to the image signal captured for one second.

Similarly, the CPU 20 sequentially compounds a newly ROI area according to a ROI area 40b to be set in each image signal captured for a following one second, and finds the ROI information. Then, the CPU 20 renews the ROI information r0 stored in the working area R0 according to the found ROI information. Further, the CPU 20 transfers the ROI information r0 stored in the working area R0 into the memory area R1 of the flash memory 36 after it takes one second. Then, the CPU 20 resets the ROI information r0 of the working area R0. As a result, the CPU 20 finds the ROI information of the ROI area compound according to the image signal captured for the following one second. By repeating the above-mentioned operation, the CPU 20 finds the ROI information of one compound ROI area at every one second, and stores into the memory area R1.

Next, referring to FIG. 12, the CPU 20 starts reading out the image signal at a time t0. The CPU 20 stores the ROI information of the ROI area to be compound for one second from the time t0 to a time t0+1 sec. into the working area R0. Then, at the t0+1 sec., the CPU 20 transfers the ROI information r0 stored in the working area R0 into the memory area R1, and resets the ROI information r0 stored in the working area.

The CPU 20 stores the ROI information found for one second from the time t0+1 sec. to a time t0+2 sec. into the working area R0. Then, at the time t0+2 sec., the CPU 20 changes a label of the working area in such a manner that the memory area R1 is replaced as the memory R2, the memory area R2 is replaced as the memory R3, the memory area R3 is replaced as the memory R4, and the memory area R4 is replaced as the memory R1, and then, the CPU 20 transfers the ROI information r0 stored in the working area R0 into the memory area R1, and resets the ROI information r0 of the working area R0.

The CPU 20 stores the ROI information found for one second from the time t0+2 sec. to a time t0+3 sec. into the working area R0. Then, at the time t0+3 sec., the CPU 20 changes the label of the working area in such a manner that the memory area R1 is replaced as the memory R2, the memory area R2 is replaced as the memory R3, the memory area R3 is replaced as the memory R4, and the memory area R4 is replaced as the memory R1, and then, the CPU 20 transfers the ROI information r0 stored in the working area R0 into the memory area R1, and resets the ROI information r0 of the working area R0.

The CPU 20 stores the ROI information found for one second from the time t0+3 sec. to a time t0+4 sec. into the working area R0. Then, at the time t0+4 sec., the CPU 20 changes the label of the working area in such a manner that the memory area R1 is replaced as the memory R2, the memory area R2 is replaced as the memory R3, the memory area R3 is replaced as the memory R4, and the memory area R4 is replaced as the memory R1, and then, the CPU 20 transfers the ROI information r0 stored in the working area R0 into the memory area R1, and resets the ROI information r0 of the working area R0.

The CPU 20 stores the ROI information found for one second from the time t0+4 sec. to a time t0+5 sec. into the working area R0. Then, at the time t0+5 sec., the CPU 20 changes the label of the working area in such a manner that the memory area R1 is replaced as the memory R2, the memory area R2 is replaced as the memory R3, the memory area R3 is replaced as the memory R4, and the memory area R4 is replaced as the memory R1, and then, the CPU 20 transfers the ROI information r0 stored in the working area R0 into the memory area R1, and resets the ROI information r0 of the working area R0.

Similarly, at each one second, the CPU 20 sequentially changes the label of the memory areas R1-R4, and repeats a sequence of the operation that the CPU 20 transfers the ROI information r0 stored in the working area R0 from the working area R0 to the working area R1.

Figure 13A:
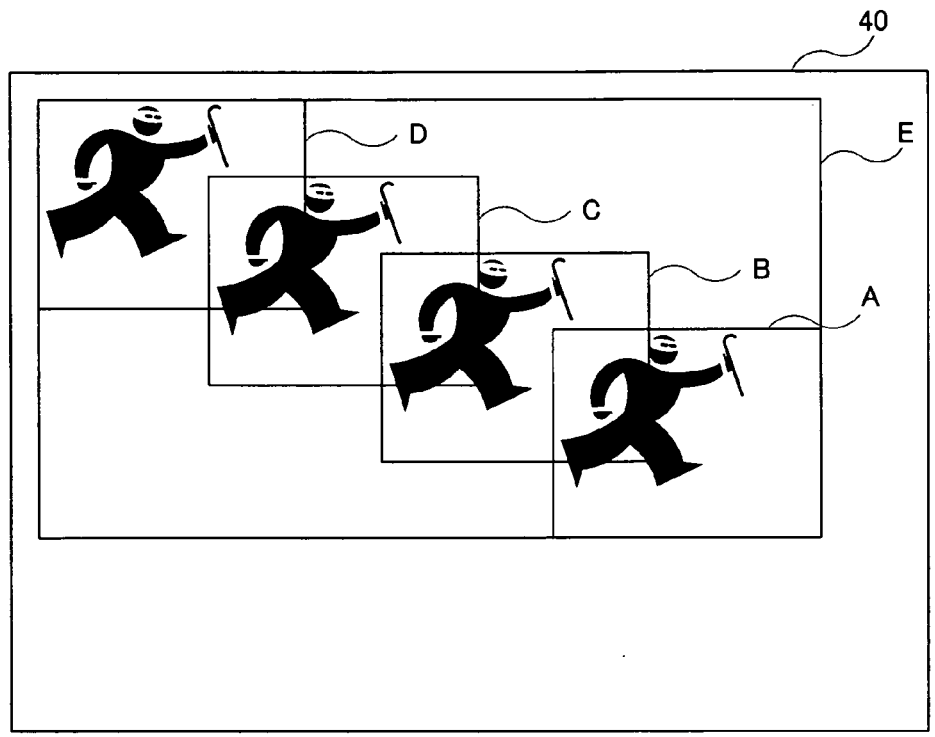
FIGS. 13A and 13B are schematic diagrams showing a further portion of the operation of the FIG. 9 embodiment.

Next, referring to FIGS. 13A and 13B, it is supposed that certain object with movement is the trespasser, and a case that the CPU 20 sets the ROI area to a route which the trespasser moved will be described. In the FIG. 13A, it is shown that there are the ROI area A set at a current time, the ROI areas B-D set for past three seconds, and the trespasser included in each of ROI areas A-D according to the ROI information r1-r4 respectively stored in the memory areas R1-R4.

Thus, in order that the CPU 20 sets a ROI area E including areas of not only showing the trespasser at the current time, but also showing the route which the trespasser moved for three seconds from the current time to three seconds ago, and first, the CPU 20 compounds a newly ROI area (not shown) from the ROI area A and the ROI area B according to the ROI information r1 and r2 stored in the memory area R1 and R2 respectively. Next, the CPU 20 compounds another ROI area (not shown) from the ROI area C and the compound ROI area according to the compound ROI area and the ROI information r3 stored in the memory area R3. Then, the CPU 20 compounds the other ROI area (not shown) from the ROI area D and the compound ROI area according to the compound ROI area and the ROI information r4 stored in the memory area R4. As a result, the CPU 20 compounds the newly ROI area E including all of the ROI areas A-D.

Figure 13B:
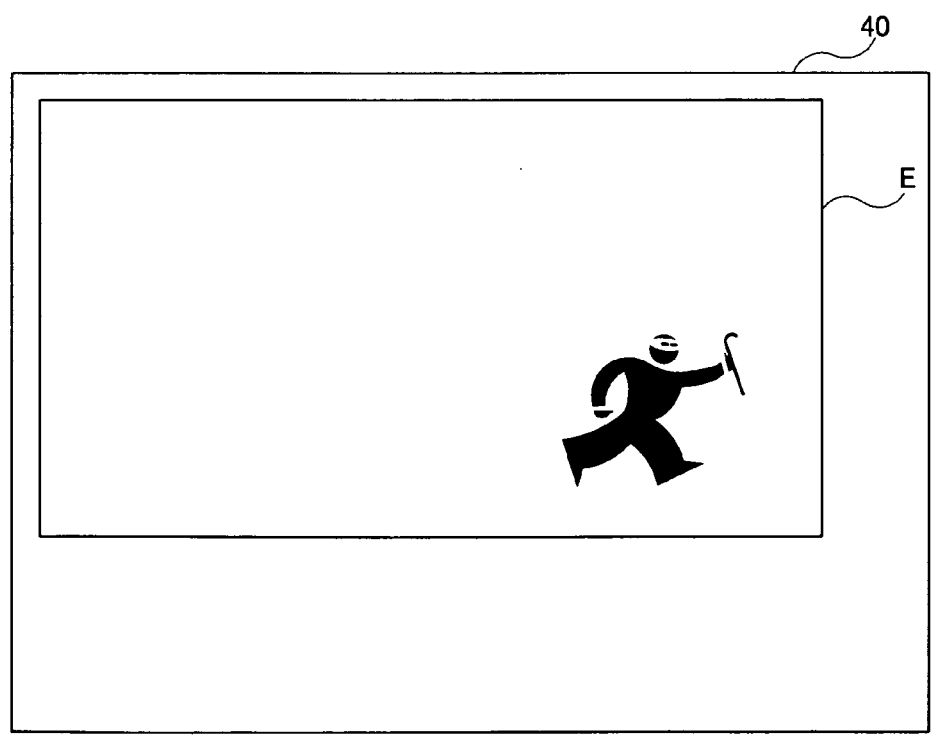
Figure 14:
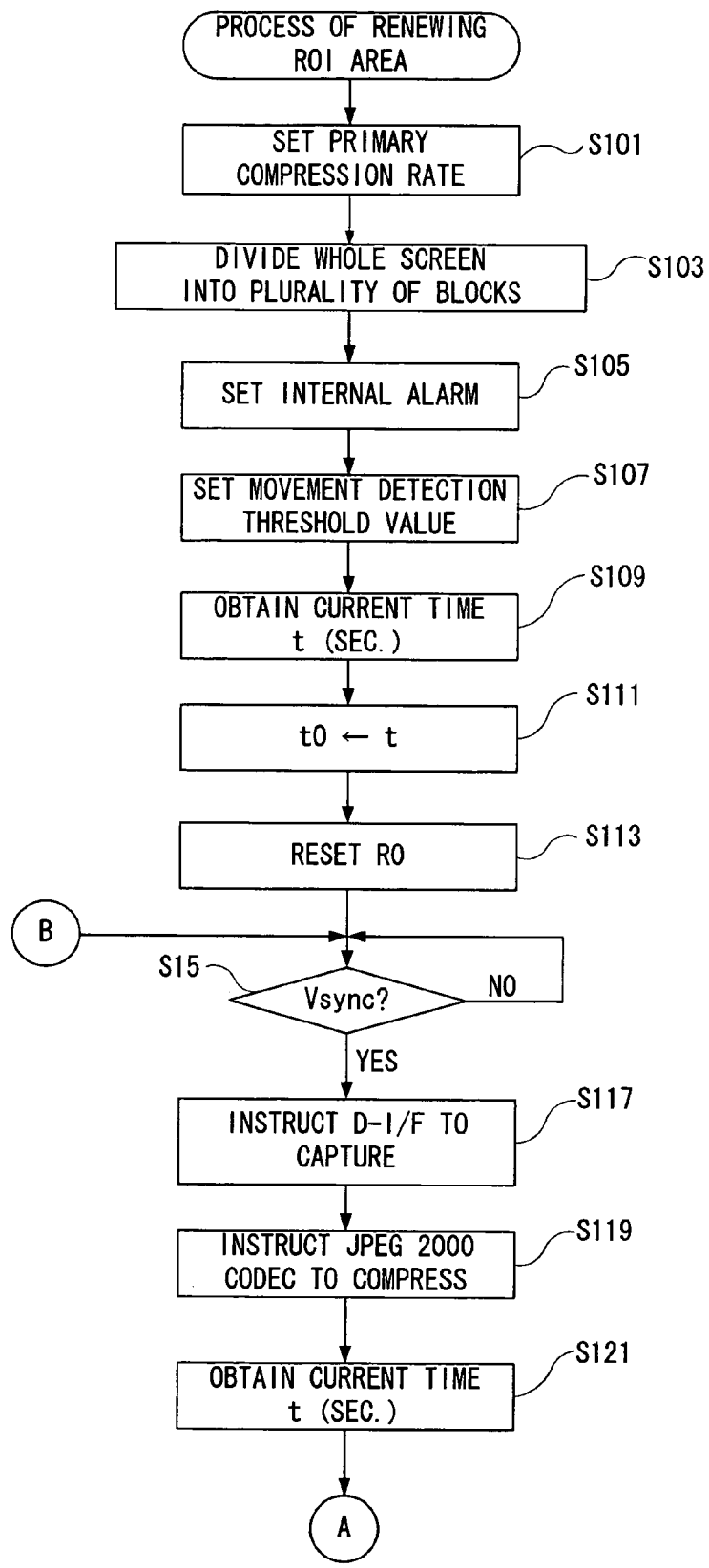
FIG. 14 is a flowchart showing the portion of the operation of the FIG. 9 embodiment.
Figure 15:
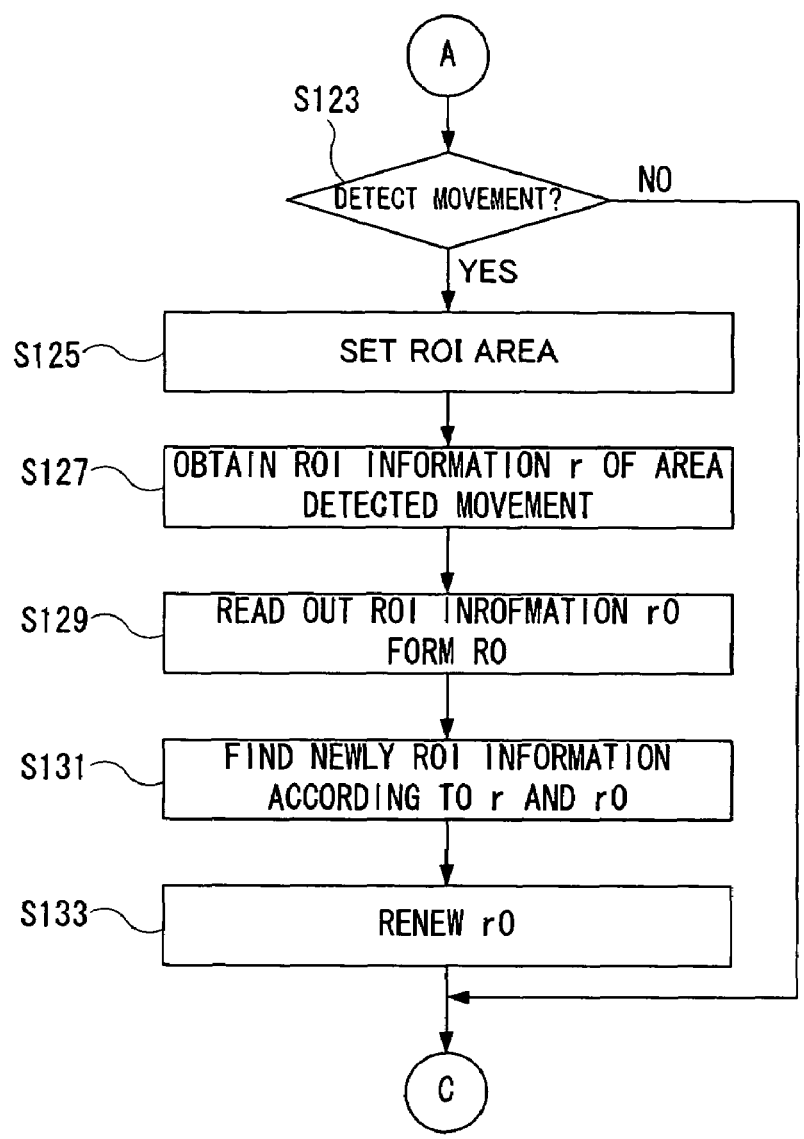
FIG. 15 is a flowchart showing another portion of the operation of the FIG. 9 embodiment.
Figure 16:
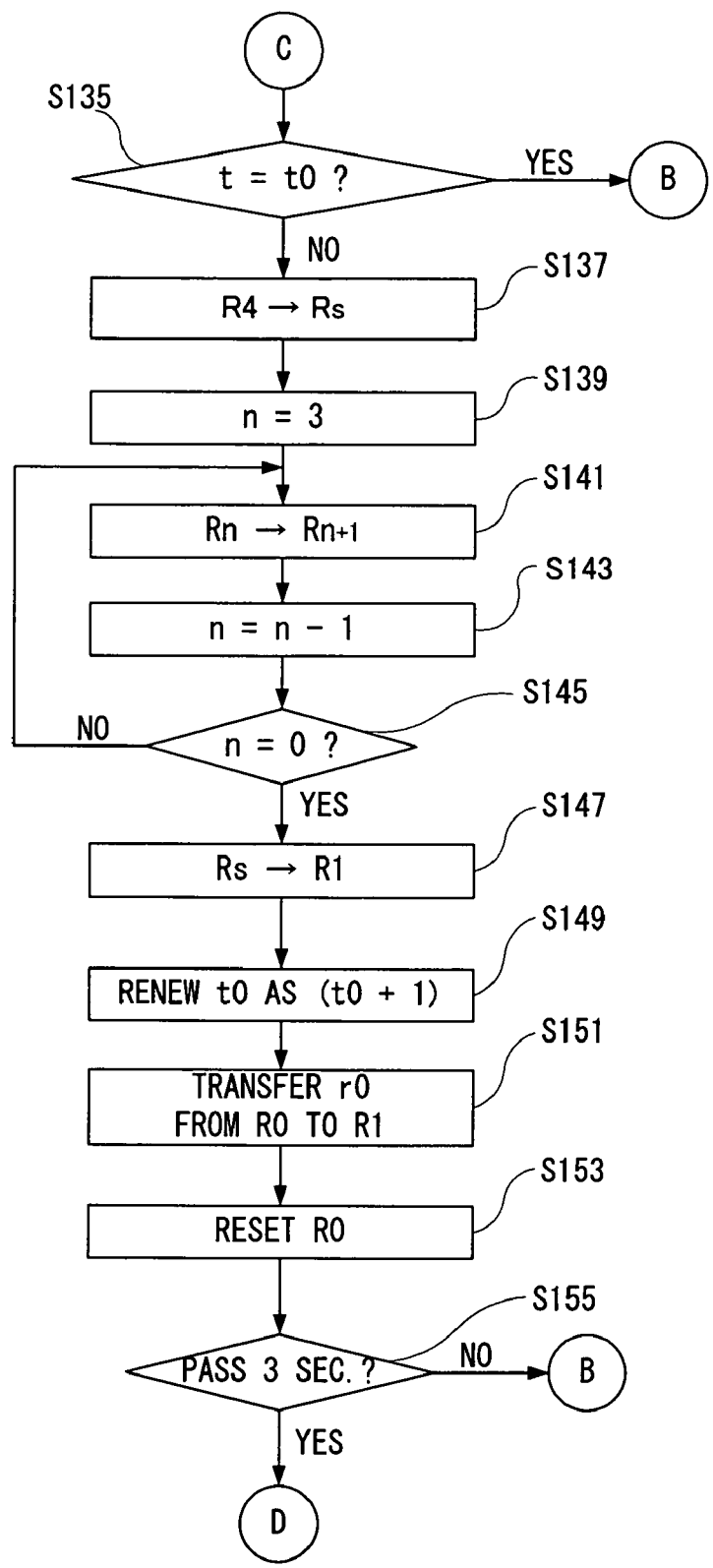
FIG. 16 is a flowchart showing the other portion of the operation of the FIG. 9 embodiment.
Figure 17:
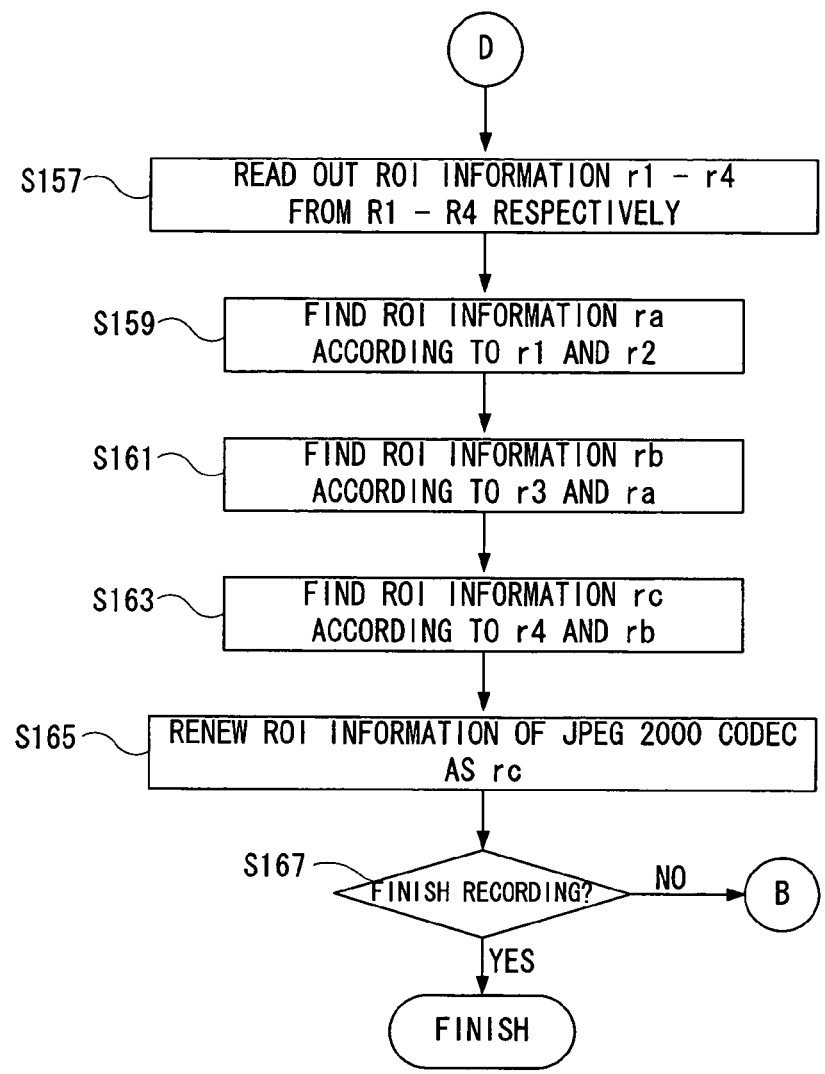
FIG. 17 is a flowchart showing a further portion of the operation of the FIG. 9 embodiment.

Next, FIG. 13B is the schematic diagram showing the image displayed in the monitor 40, when the compressed image signal is expanded. That is, not only the current trespasser but also the all images included in the ROI area E are displayed as the high quality image in the monitor 40. Thus, the image including not only the trespasser but also the route which the trespasser moved is displayed as the high quality image in the monitor 40. Therefore, in a case that there is a trace which the trespasser left, it is capable to reproduce the image signal including the trace as the high quality image.

It is noted that in a case that the trespasser suspends moving only for a time of less than one second, the CPU 20 cannot renew the ROI information r0 of the working area R0, because the CPU 20 cannot set the ROI area at this time. However, when the trespasser starts moving again, the CPU 20 sets the ROI area again and renews the ROI information r0 of the working area R0. Thus, in a case that the trespasser starts moving again after the trespasser temporarily stops moving, it is capable to set the ROI area to the route which the trespasser moved in the same way as a case that the trespasser just didn't stop moving.

However, in a case that the trespasser stops moving for more than one second, the ROI information r0 stored in the working area R0 becomes "0", because the CPU 20 just cannot set the ROI area at this time. Then, the ROI information of the memory area transferred from the working area R0 also becomes "0". Therefore, even if the CPU 20 compounds the ROI area according to the ROI area of the memory area as the above-mentioned case, the ROI area is the same as the ROI area before the CPU 20 compounds. Further, in a case that the trespasser stops moving for more than three seconds, all of the ROI information r1-r4 stored in the memory areas R1-R4 become "0", and the CPU 20 just cannot set the ROI area to the image displayed in the monitor 40.

Next, referring to FIG. 14-FIG. 17, a processing flow of renewing the ROI area in the second embodiment will be described. It is noted that an operator is capable to switch this ROI area renewing operation and an ROI area renewing operation in a third embodiment described later by operating an operating panel (not shown)

First, in a step S101, the CPU 20 respectively sets the different primary compression rates to the compression rate of the image of the ROI area and the vicinity area. In a step S103, the CPU 20 divides the whole of the screen in the monitor 40 into the plurality of blocks. In a step S105, the CPU 20 decides the block to be set the internal alarm on the divided screen, that is, the CPU 20 decides the location of the block that the movement detection circuit 18 finds the luminance change of the Y signal. In a step S107, the CPU 20 sets the detection threshold value of the luminance change of the Y signal detected by the movement detection circuit 18. In a step S109, the CPU 20 obtains a current time t from the clock 42. It is noted that the obtained time t is the time by one second, because the clock 42 cannot tick away by less than one second. In a step S111, the CPU 20 stores the obtained current time t into t0 of the working area T0. In a step S113, the CPU 20 resets the ROI information r0 of the working area R0.

In a step S115, the CPU 20 is waiting until the vertical synchronizing signal Vsync is occurred. When the vertical synchronizing signal is occurred, the CPU 20 instructs the D-I/F 16 to capture the analog signal from the surveillance camera 12 in a step S117. The D-I/F 16 generates the Y signal, the U signal, and V signal from the captured analog signal, and converts the generated signals into the digital signal, and then applies the converted image signal to the memory control circuit 24. The memory control circuit 24 writes the applied image signal into the SDRAM 26.

In a step S119, the CPU 20 instructs the JPEG 2000 CODEC 28 to compress the image signal. When the JPEG 2000 CODEC 28 is received the compression instruction of the image signal, the JPEG 2000 CODEC 28 requests the memory control circuit 24 to read out the image signal, and reads out the image signal from the SDRAM 26. Then, the JPEG 2000 CODEC 28 compresses the read image signal according to the ROI information applied by the CPU 20. In a step S121, the CPU 20 obtains the current time t from the clock 42. The obtained current time t is also the time by one second in the same way as the step S109.

In a step S123, the CPU 20 determines whether the movement of the object is detected by the internal alarm or not. As a result, if NO, the process advances to a S135, because it is unnecessary to renew the ROI information. On the other hand, if YES, in a step S125, the CPU 20 specifies the block in which the internal alarm is detected, and sets the ROI area to the specified block. In a step S127, the CPU 20 obtains the ROI information r of the ROI area to be set. In a step S129, the CPU 20 reads out the ROI information r0 from the working area R0. In a step S131, the CPU 20 finds the ROI information of the newly ROI area according to the obtained ROI information r and the read ROI information r0. In a step S133, the CPU 20 renews the ROI information r0 of the working area R0 according to the found ROI information.

Next, in the step S135, the CPU 20 determines whether the current time t obtained in the step S121 is same as the time t0 stored in the working area T0 or not. As a result, if YES, the process returns to the step S115. On the other hand, if NO, in a step S137, the CPU 20 saves the ROI information r4 of the memory area R4 into a saving area Rs set in the flash memory 36. In a step S139, the CPU 20 sets 3 to a variable n. In a step S141, the CPU 20 changes the label Rn of the memory area to the label Rn+1. In a step S143, the CPU 20 subtracts 1 from the variable n. In a step S145, the CPU 20 determines whether the variable n is 0 or not. As a result, if NO, the process returns to the step S141, and if YES, the process advances to a step S147. In the step S147, the CPU 20 transfers the ROI information saved in the saving area Rs into the memory area R1.

In a step S149, the CPU 20 renews the time t0 stored in the working area T0 as the time t0+1 sec. that it took one second from the time t0. In a step S151, the CPU 20 transfers the ROI information r0 stored in the working area R0 into the memory area R1. In a step S153, the CPU 20 resets the ROI information r0 of the working area R0. In a step S155, the CPU 20 determines whether it takes three second from the time when the CPU 20 primarily reads out the image signal or not. As a result, if NO, the process returns to the S115, because the ROI information is not stored in at least one of the memory areas R1-R4 yet. On the other hand, if YES, the process advances to a S157, because the ROI information r1-r4 are respectively stored in the memory areas R1-R4.

In the step S157, the CPU 20 reads out the ROI information r1-r4 from the memory areas R1-R4. In a step S159, the CPU 20 finds a ROI information ra of the newly ROI area according to the ROI information r1 and the ROI information r2 in the read ROI information r1-r4. In a step S161, the CPU 20 finds a newly ROI information rb according to the read ROI information r3 and the found ROI information ra. In a step S163, the CPU 20 finds a newly ROI information rc according to the read ROI information r4 and the found ROI information rb. As a result, it is capable to obtain the ROI information rc of the ROI area E compound for three seconds from the current time to three seconds ago In a step S165, the CPU 20 renews the ROI information applied to the JPEG 2000 CODEC 28 as the ROI information rc to be newly obtained. In a step S167, the CPU 20 determines whether it finishes recording into the HDD 32 or not. As a result, if NO, the process returns to the S115, and if YES, the process is finished.

Next, the third embodiment of this present invention will be described. In the third embodiment, not only compounding the plurality of the past ROI areas in the same way as in the second embodiment, the CPU 20 predicts a future movement of the trespasser, and sets a predicted ROI area including a predicted location of the trespasser. Then, the CPU 20 compounds the ROI area including the route which the trespasser might move from the past to the future by compounding the past ROI area and the predicted ROI area. It is noted that the block diagrams and the detailed descriptions in the third embodiment are herein omitted because they are the same or similar to those of the second embodiment.

Figure 18:
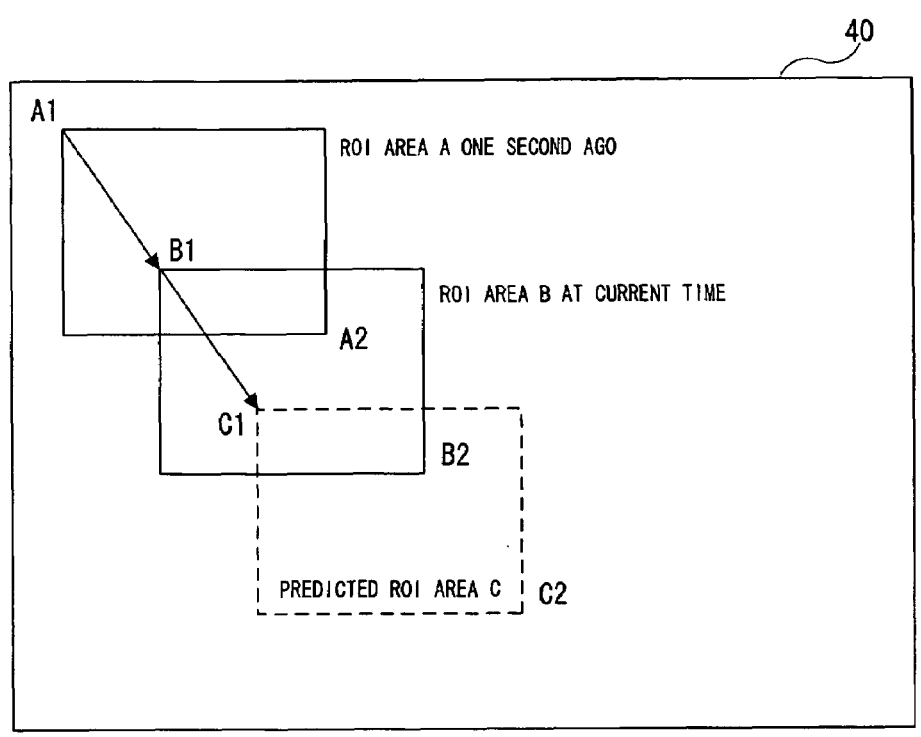
FIG. 18 is a schematic diagram showing the portion of the operation of the other embodiment of the present invention.

Referring to FIG. 18, a method of predicting the future ROI area C according to the ROI information at the time one second ago and the ROI area B at the current time will be described. It is supposed that the forms of the ROI areas are rectangular for convenience. Therefore, the location of the ROI information on the screen is able to represent by coordinates of two apexes in a diagonal direction respectively. As shown in FIG. 18, the coordinates of the apexes A1 and A2 of the ROI area A are represented by (Xa1, Ya1) and (Xa2, Ya2) respectively. It is noted that there are the inequality Xa1<Xa2 and Ya1<Ya2 in relation to the coordinates of the apexes A1 and A2. In addition, the coordinates of the apexes B1 and B2 of the ROI area B are represented by (Xb1, Yb1) and (Xb2, Yb2) respectively. It is noted that there are the inequality Xb1<Xb2 and Yb1<Yb2 in relation to the coordinates of the apexes B1 and B2. In addition, the coordinates of the apexes C1 and C2 of the predicted ROI area C are represented by (Xc1, Yc1) and (Xc2, Yc2) respectively. It is noted that there are the inequality Xc1<Xc2 and Yc1<Yc2 in relation to the coordinates of the apexes C1 and C2.

The CPU 20 finds the coordinates of the apexes C1 and C2 of the predicted ROI area C according to the coordinates of the ROI area A and the ROI area B. The CPU 20 finds the X coordinate of the apex C1 by equation (17).

$$Xc1 = Xb1 + (Xb1 - Xa1) \quad (17)$$

The CPU 20 finds the Y coordinate of the apex C1 by equation (18).

$$Yc1 = Yb1 + (Yb1 - Ya1) \quad (18)$$

The CPU 20 finds the X coordinate of the apex C2 by equation (19).

$$Xc2 = Xb2 + (Xb2 - Xa2) \quad (19)$$

The CPU 20 finds the Y coordinate of the apex C2 by equation (20).

$$Yc2 = Yb2 + (Yb2 - Ya2) \quad (20)$$

That is, the CPU 20 finds the moving vector that is the moving direction and moving amount from the ROI area A to the ROI area B, and finds the coordinate of the predicted ROI area C by adding the ROI information of the ROI area B to the found moving direction and moving amount. Thus, it is capable to compress the image signal including a place where the trespasser tries to move as the high quality image, because the CPU 20 compounds not only the ROI area shown the route which the trespasser moved in the past but also the ROI area including the predicted place where the trespasser might move in the future. Therefore, it is capable to progress in the surveillance function.

Next, referring to FIG. 19, the CPU 20 starts reading out the image signal at the time t0. The CPU 20 stores the ROI information of the ROI area to be compound for one second from the time t0 to the time t0+1 sec. into the working area R0. Then, at the t0+1 sec., the CPU 20 transfers the ROI information r0 stored in the working area R0 into the memory area R1, and resets the ROI information r0 stored in the working area R0.

The CPU 20 stores the ROI information of the ROI area compounded for one second from the time t0+1 sec. to a time t0+2 sec. into the working area R0. Then, at the time t0+2 sec., the CPU 20 changes the label in such a manner that the memory area R1 is replaced as the memory R2, the memory area R2 is replaced as the memory R3, the memory area R3 is replaced as the memory R1. Next, the CPU 20 transfers the ROI information r0 stored in the working area R0 into the memory area R1, and resets the ROI information r0 of the working area R0.

The CPU 20 stores the ROI information of the ROI area compounded for one second from the time t0+2 sec. to a time t0+3 sec. into the working area R0. Then, at the time t0+3 sec., the CPU 20 changes the label in such a manner that the memory area R1 is replaced as the memory R2, the memory area R2 is replaced as the memory R3, the memory area R3 is replaced as the memory R1. Next, the CPU 20 transfers the ROI information r0 stored in the working area R0 into the memory area R1, and resets the ROI information r0 of the working area R0.

The CPU 20 stores the ROI information of the ROI area compounded for one second from the time t0+3 sec. to a time t0+4 sec. into the working area R0. Then, at the time t0+4 sec., the CPU 20 changes the label in such a manner that the memory area R1 is replaced as the memory R2, the memory area R2 is replaced as the memory R3, the memory area R3 is replaced as the memory R1. Next, the CPU 20 renews the ROI information of the working area R1 according to the ROI information r0 stored in the working area R0, and resets the ROI information r0 of the working area R0.

Similarly, at each one second, the CCPU 20 sequentially changes the label of the memory areas R1-R4, and repeats the sequence of the operation that the CPU 20 transfers the ROI information r0 stored in the working area R0 from the working area R0 to the working area R1.

Figure 20A:
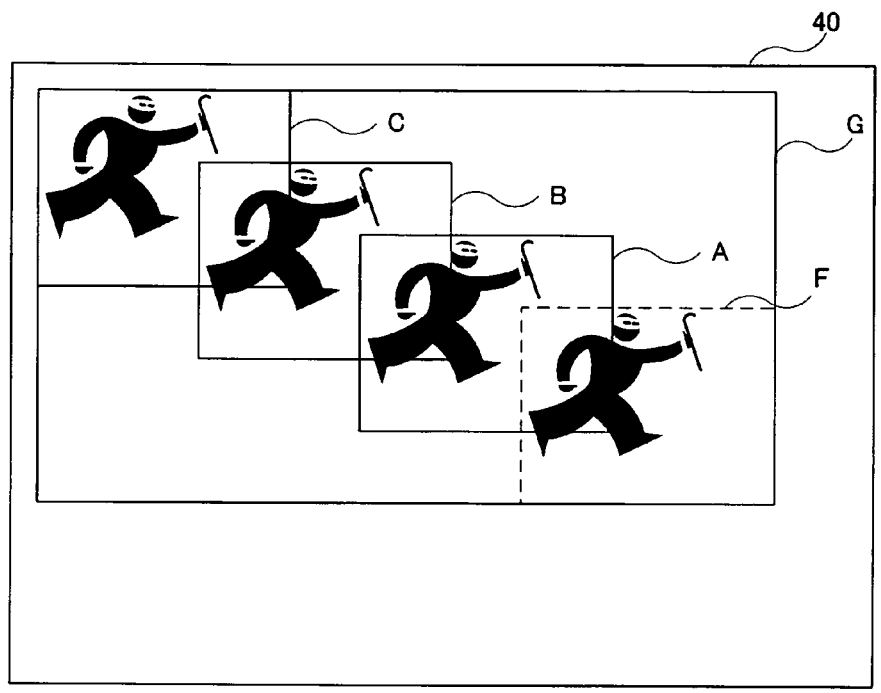
FIGS. 20A and 20B are schematic diagrams showing the portion of the other operation of the other embodiment of this present invention.

Next, referring to FIGS. 20A and 20B, a case that the CPU 20 sets the ROI area to the route which the trespasser moved and the predicted route which the trespasser might move in the future will be described. FIG. 20A is the schematic diagram showing the ROI areas A-C set at the current time and for past two seconds, the predicted ROI area F where the trespasser might move in the future, and the trespasser included in these ROI areas A-C, and F according to the ROI information r1-r3 stored in the memory areas R1-R3.

Thus, it is necessary to set not only the ROI area including the trespasser at the current time and the route which the trespasser moved for two seconds from the current time to two seconds ago, but also the predicted ROI area F including the place where the trespasser might move for a future one second. Therefore, first, the CPU 20 finds the moving vector from the ROI area B to the ROI area A according to the ROI information r1 and r2 stored in the memory area R1 and R2 respectively. Then, the CPU 20 adds the found moving vector to the ROI information r1. Thus, the CPU 20 sets the predicted ROI area F, and finds the ROI information re.

Next, the CPU 20 compounds the newly ROI area (not shown) from the ROI area A and the ROI area B according to the ROI information r1 and r2 stored in the memory area R1 and R2 respectively, and finds the ROI information rf of the compounded ROI area. Next, the CPU 20 compounds another ROI area (not shown) from the compounded ROI area and the ROI area C according to the ROI information rf of the compounded ROI area and the ROI information r3 stored in the memory area R3, and finds the ROI information rf of the compounded ROI area, and finds the ROI information rg of the compounded ROI area.

Then, the CPU 20 compounds a newly ROI area G, and finds the ROI information rh of the ROI area G.

Figure 20B:
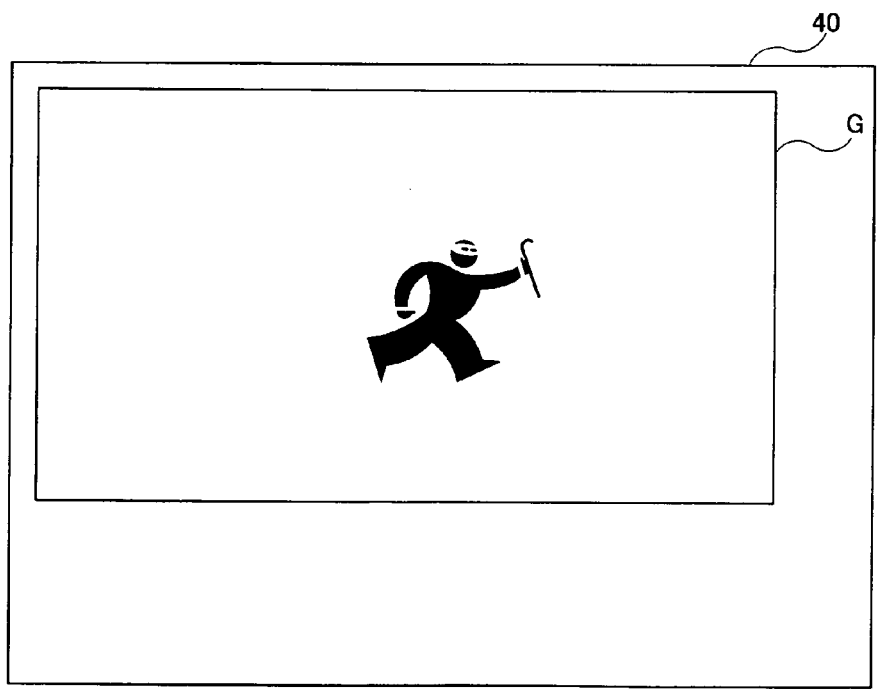
Figure 21:
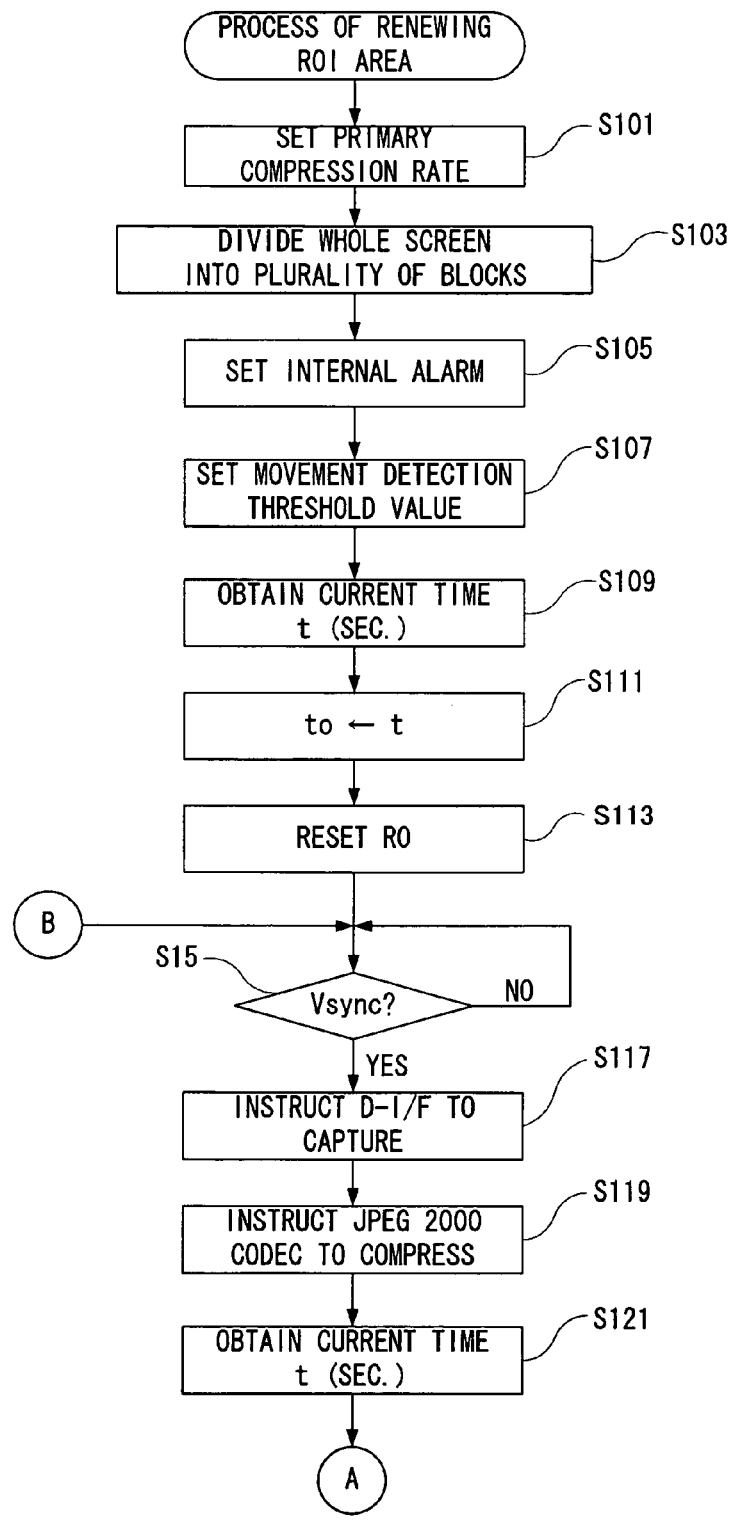
FIG. 21 is a flowchart showing the portion of the operation of the other embodiment of this present invention.
Figure 22:
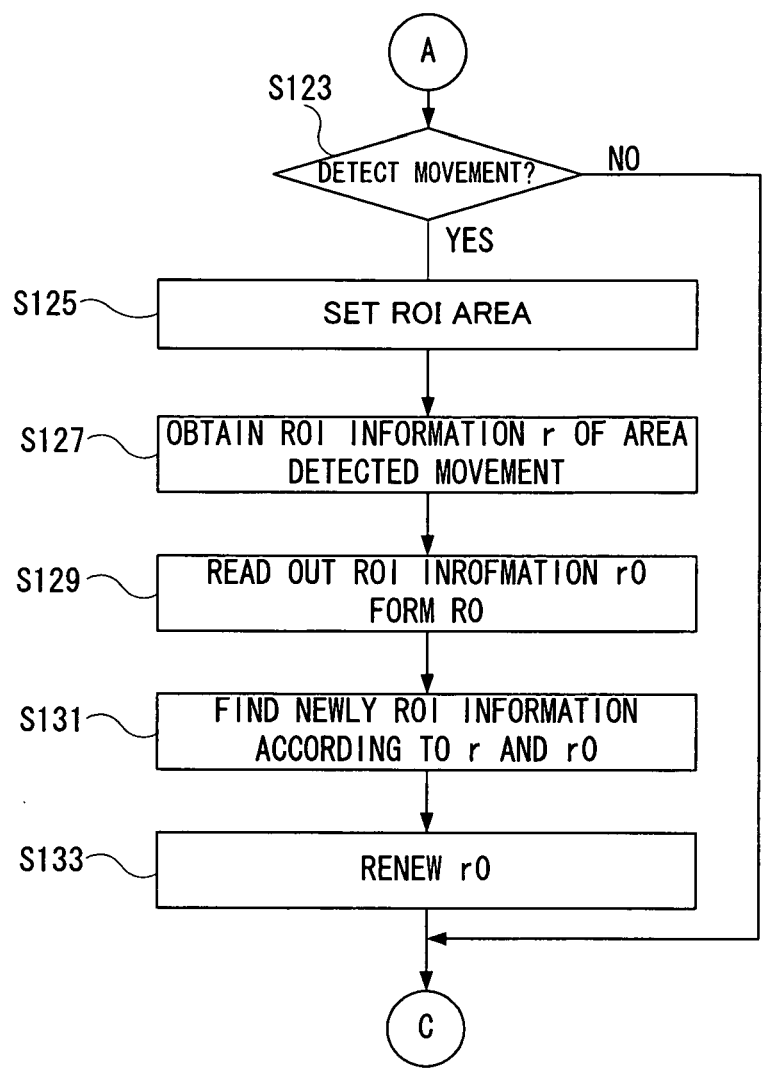
FIG. 22 is a flowchart showing another portion of the operation of the other embodiment of this present invention.
Figure 23:
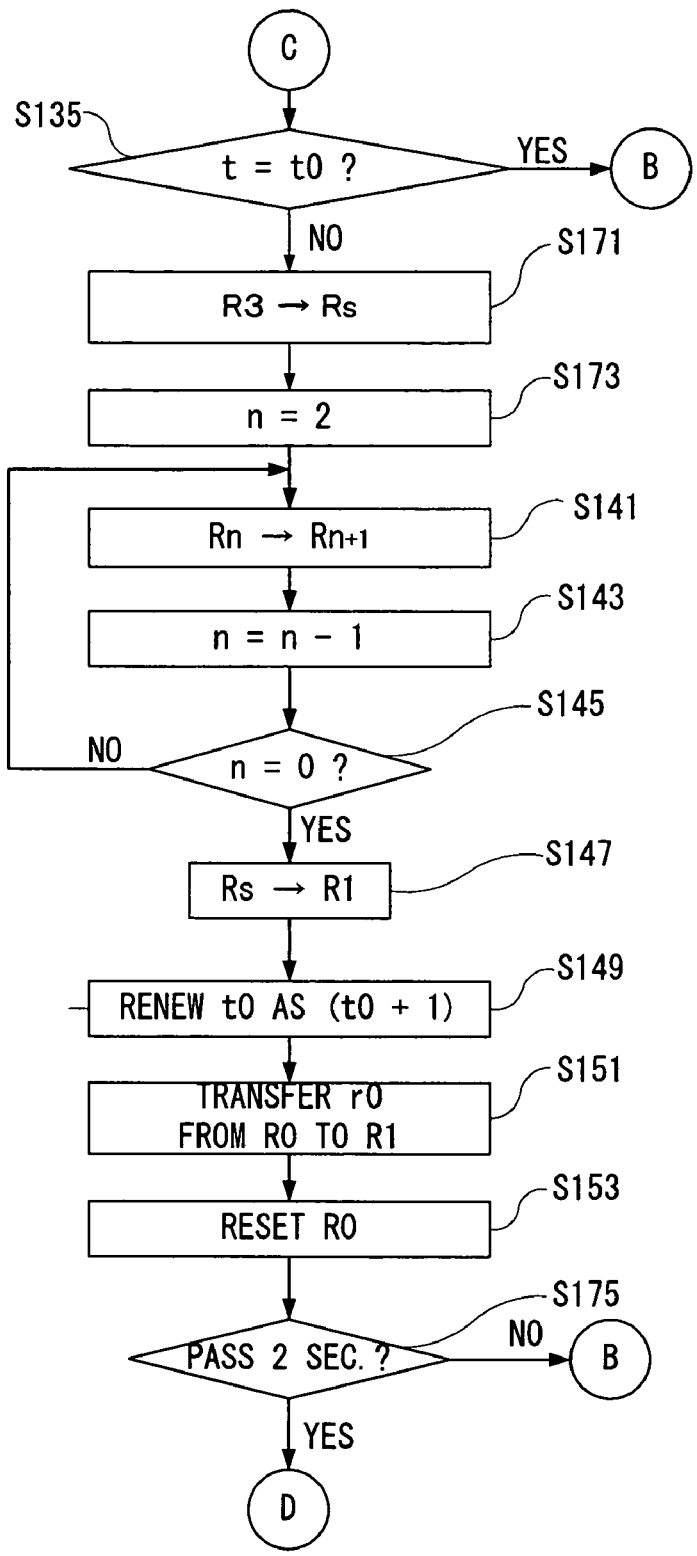
FIG. 23 is a flowchart showing the other portion of the operation of the other embodiment of this present invention.
Figure 24:
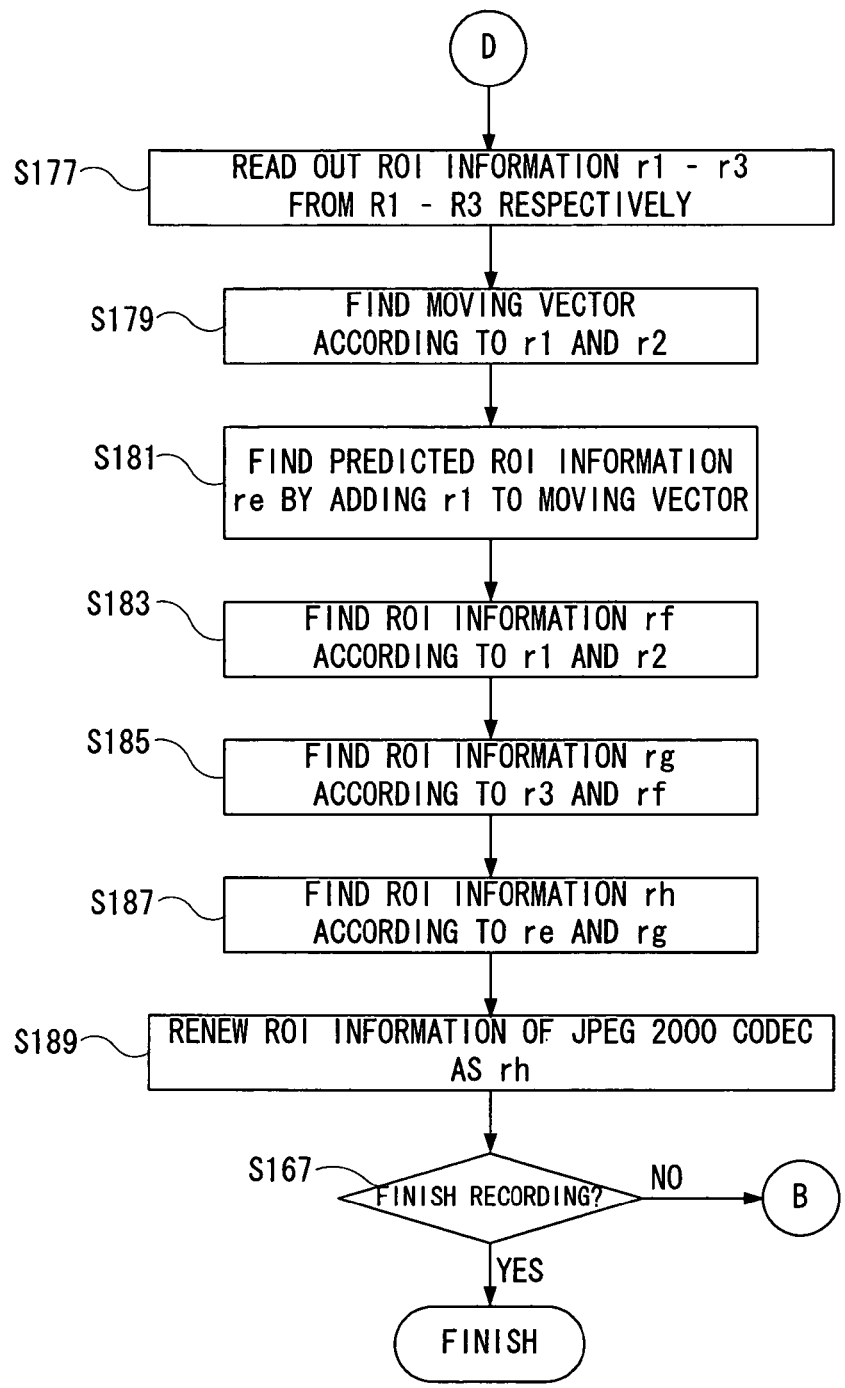
FIG. 24 is a flowchart showing the portion of a further operation of the other embodiment of this present invention.

Next, FIG. 20B is the schematic diagram showing the image displayed in the monitor 40 when the compressed image signal is expanded. That is, not only the current trespasser but also the all images included in the ROI area G are displayed as the high quality image in the monitor 40. Thus, the image including not only the route which the trespasser moved but also the predicted route which the trespasser might move in the future is displayed as the high quality image in the monitor 40. Therefore, it is capable to compress in such a manner that the image signal including not only the trace which the trespasser left on the route, but also the place where the trespasser might move in the future becomes high quality image.

In addition, referring to FIG. 21-FIG. 24 showing the processing flow of renewing the ROI area in the third embodiment, by applying identical reference step numerals to the same or similar portions, the detailed descriptions area herein omitted because they are the same or similar to the operating step of the second embodiment, and the different steps from those of the second embodiment will be described.

In the same way as in the second embodiment, in the step S135, the CPU 20 determines whether the current time t obtained in the step S121 is same as the time t0 stored in the working area T0 or not. As a result, if YES, the process returns to the step S115. On the other hand, if NO, in a step S171, the CPU 20 saves the ROI information r3 of the memory area R3 into the saving area Rs. In a step S173, the CPU 20 sets 2 to the variable n. In the step S141, the CPU 20 change the label Rn of the memory area to the label Rn+1. In the step S143, the CPU 20 subtracts 1 from the variable n. In the step S145, the CPU 20 determines whether the variable n is 0 or not. As a result, If NO, the process returns to the step S141, and if YES, the process advances to the step S147. In the step S147, the CPU 20 transfers the ROI information saved in the saving area Rs into the memory area R1.

In the step S149, the CPU 20 renews the time t0 stored in the working area T0 as the time t0+1 sec. that it took one second from the time t0. In the step S151, the CPU 20 transfers the ROI information r0 stored in the working area R0 into the memory area R1. In the step S153, the CPU 20 resets the ROI information r0 of the working area R0. In a step S175, the CPU 20 determines whether it takes two seconds from the time when the CPU 20 primarily reads out the image signal or not. As a result, if NO, the process returns to the S115, because the ROI information r1-r3 is not stored in at least one of the memory areas R1-R3 yet. On the other hand, if YES, the process advances to a S177, because the ROI information r1-r3 are respectively stored in the memory areas R1-R3.

In the step S177, the CPU 20 reads out the ROI information r1-r3 from the memory areas R1-R3. In a step S179, the CPU 20 finds the moving vector from the ROI information r2 at the time one second ago to the ROI area r1 at the current time according to the read ROI information r1 and r2. In a step S181, the CPU 20 finds the predicted ROI information re at the time after one second by adding the found moving vector to the ROI information at the current time.

Next, in a step S183, the CPU 20 finds the newly ROI information rf according to the ROI information r1 and r2. In a step S185, the CPU 20 finds the ROI information rg of the past ROI area according to the found ROI information rf and the read ROI information r3. In a step S187, the CPU 20 finds the ROI information rh of the ROI area G including the route which the trespasser moved and the predicted route which the trespasser might move according to the past ROI information rg and the predicted ROI information re. As a result, it is capable to obtain the ROI information rh of the ROI area G including the predicted ROI area for one second from the current time to the time after one second.

In a step S189, the CPU 20 renews the ROI information applied to the JPEG 2000 CODEC 28 as the ROI information rc to be newly obtained. In the step S167, the CPU 20 determines whether it finishes recording into the HDD 32 or not. As a result, if NO, the process returns to the S115, and if YES, the process is finished.

As understood from the above descriptions, the portion of the image of the ROI area including the object image, which is the object with movement, in the photographed subject image of the field is compressed by the first compression rate, and the portion of image in the area except for the ROI area is compressed by the second compression rate, which is higher than the first compression rate. Then, the ROI information of the ROI area is changed so as to include the motion range of the object with movement into the portion of the image of the ROI area. As a result, it is capable to progress in the surveillance function, because the motion range of the object with movement is included into the portion of the image of the ROI area.

It is noted that in order to transfer the ROI information from the working area R0 to the working area R1 in the above second embodiment and third embodiment, the CPU 20 changes the just label by shifting sequentially without moving the ROI information r0-r4 stored in the memory areas R1-R4 respectively. However, the CPU 20 may shift the ROI information r0-r4 stored in each of the memory areas R1-R4 sequentially without changing the label of the memory areas R1-R4.

Although the present invention has been described and illustrated in detail, it is clearly understood that the same is by way of the schematic diagram and example only and is not to be taken by way of limitation, the spirit and scope of the present invention being limited only by the terms of the appended claims.

What is claimed is:

1. An image processing apparatus comprising:
    a compressing circuit for compressing an image signal in a screen including at least one noticed area;
    a first noticed area detecting circuit for detecting the at least one noticed area in the screen;
    a first determining circuit for determining whether the noticed areas overlap each other or not when two or more noticed areas detected by said first noticed area detecting circuit exist; and
    a first compound area setting circuit for setting a compound area so as to include the overlapped noticed areas when a determination result of said first determining circuit is affirmative.

2. An image processing apparatus according to claim 1, further comprising:
    a second noticed area detecting circuit for detecting a noticed area in the screen after said first compound area setting circuit sets the compound area;
    a first vicinity area specifying circuit for specifying an area not to be set the compound area as a vicinity area when said second noticed area detecting circuit cannot detect the noticed area;
    a first calculating circuit for calculating compression rates of the compound area and the vicinity area respectively in such a manner that a compression target size in the screen becomes constant according to importance coefficients provided to each of the compound area and the vicinity area; and
    a first image compressing circuit for compressing each of portions of the image signal in the compound area and the vicinity area according to the compression rates found by said first calculating circuit.

3. An image processing apparatus according to claim 2, wherein
    said first vicinity area specifying circuit includes a second vicinity area specifying circuit for specifying an area not to be detected the noticed area and the compound area as the vicinity area when said second noticed area detecting circuit detects the noticed area;
    said first calculating circuit includes a second calculating circuit for calculating compression rates of the compound area, the noticed area, and the vicinity area respectively in such a manner that the compression target size in the screen becomes constant according to importance coefficients provided to each of the compound area, the noticed area, and the vicinity area; and
    said first image compressing circuit includes a second image compressing circuit for compressing each of portions of the image signal in the compound area, the noticed area, and the vicinity area according to the compression rates found by said second calculating circuit.

4. An image processing apparatus according to claim 1, further comprising:
a third vicinity area specifying circuit for specifying an area not to be detected the noticed area as the vicinity area when the determination result of said first determining circuit is negative;
a third calculating circuit for calculating compression rates of the noticed area and the vicinity area respectively according to importance coefficients provided to each of the noticed area and the vicinity area; and
a third image compressing circuit for compressing each of portions of the image signal in the noticed area and the vicinity area according to the compression rates found by said third calculating circuit.

5. An image processing apparatus according to claim 1, further comprising:
a rectangular setting circuit for setting a rectangular form to the noticed area and the compound area respectively;
a coordinate detecting circuit for detecting a X coordinate and a Y coordinate of two apexes in a diagonal direction of the overlapped noticed area respectively;
a coordinate specifying circuit for specifying a maximum and a minimum of the X coordinate and the Y coordinate detected by said coordinate detecting circuit; and wherein
said first compound area setting circuit includes a second compound area setting circuit for setting the compound area having in the diagonal direction the apexes specified by each of the minimum and maximum of the X coordinate and the Y coordinate specified by said coordinate specifying circuit.

6. An image processing apparatus according to claim 1, wherein
said first noticed area detecting circuit includes a fixed area detecting circuit for detecting a fixed area which a location of the fixed area is fixed and a moving area detecting circuit for detecting a moving area which a location of the moving area moves according to a movement of an object;
said first determining circuit includes a second determining circuit for determining an overlap between the fixed area and the moving area; and
said first compound area setting circuit includes a third compound area setting circuit for setting the compound area so as to include the fixed area and the moving area when said second determining circuit determines that the fixed area and the moving area overlap.

7. An image processing apparatus according to claim 1, wherein
the image signal in the screen is an image signal outputted from a surveillance camera.

8. An image compressing apparatus, comprising:
a compressing circuit for compressing a plurality of portions of an image formed a photographed subject image of a field by a plurality of compression rates;
a first validating circuit for validating a first compression rate to a first portion of the image including an object image being the object with movement in the plurality of the portions of the image;
a second validating circuit for validating a second compression rate which is higher than the first compression rate to a second portion of the image which is different from the first portion of the image in the plurality of the portions of the image; and a changing circuit for changing at least one of a location and an image size of the first portion of the image according to a motion progress of the object with movement.

9. An image compressing apparatus according to claim 8, further comprising:
a detecting circuit for detecting the object with movement according to a luminance change of the subject image of the field; and
a generating circuit for generating the motion progress according to a detection result of said detecting circuit.

10. An image compressing apparatus according to claim 9, wherein
said detecting circuit detects the object with movement at every a first predetermined time;
said generating circuit generates the motion progress at every a second predetermined time which is longer than the first predetermined time.

11. An image compressing apparatus according to claim 10, wherein
said changing circuit for changing at least one of the location and the image size according to the motion progress corresponding to a third predetermined time which is longer than the second predetermined time.

12. An image compressing apparatus according to claim 8, further comprising:
a predicting circuit for predicting a destination of the object with movement according to the motion progress; and wherein
said changing circuit changes at least one of the location and the image size according to the motion progress and a prediction result of the predicting circuit.

13. An image processing method, comprising the step of:
(a) compressing a plurality of portions of an image formed a photographed subject image of a field by a plurality of compression rates respectively using a compression circuit;
(b) detecting at least one noticed area in the plurality of the portions of the image using a first noticed area detecting circuit;
(c) determining, using a first determining circuit, whether the noticed areas overlap each other or not when two or more noticed areas detected by said step (b) exist;
(d) setting a compound area using a first compound area setting circuit, so as to include the overlapped noticed area when a determination result by said step (c) is affirmative;
(e) validating a first compression rate to the noticed area using a first validating circuit;
(f) validating, using a second validating circuit, a second compression rate which is higher than the first compression rate to an area which is different from the noticed area.

14. An image processing method according to claim 13, further comprising the step of:
(g) changing, using a changing circuit, at least one of a location and an image size of a newly noticed area according to a detection progress of the noticed area.

15. An image processing method according to claim 14, further comprising the step of:
(h) predicting, using a predicting circuit, a destination of the noticed area according to the detection progress; and wherein
said step (g) changes at least one of the location and the image size according to the detection progress and a prediction result of said step (h).

* * * * *